(12) United States Patent
Hornby et al.

(10) Patent No.: US 11,261,721 B2
(45) Date of Patent: Mar. 1, 2022

(54) TECHNIQUES FOR EVALUATING BOREHOLE SUBSURFACE GEOLOGIES USING STONELEY WAVES

(71) Applicant: HALLIBURTON ENERGY SERVICES, INC., Houston, TX (US)

(72) Inventors: Brian Edward Hornby, Fulshear, TX (US); Mark Vincent Collins, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 350 days.

(21) Appl. No.: 16/338,883

(22) PCT Filed: Nov. 30, 2017

(86) PCT No.: PCT/US2017/064007
§ 371 (c)(1),
(2) Date: Apr. 2, 2019

(87) PCT Pub. No.: WO2018/125509
PCT Pub. Date: Jul. 5, 2018

(65) Prior Publication Data
US 2021/0277767 A1      Sep. 9, 2021

Related U.S. Application Data

(60) Provisional application No. 62/440,605, filed on Dec. 30, 2016.

(51) Int. Cl.
*G01V 1/50* (2006.01)
*E21B 47/00* (2012.01)
(Continued)

(52) U.S. Cl.
CPC .......... *E21B 47/0025* (2020.05); *G01V 1/50* (2013.01); *G01V 1/40* (2013.01); *G01V 2200/16* (2013.01); *G01V 2210/646* (2013.01)

(58) Field of Classification Search
CPC ........ E21B 47/0025; G01V 1/50; G01V 1/40; G01V 2210/646
(Continued)

(56) References Cited

U.S. PATENT DOCUMENTS

| | | | | |
|---|---|---|---|---|
| 4,577,689 A | * | 3/1986 | Dotson | E21B 49/006 166/250.1 |
| 4,831,600 A | * | 5/1989 | Hornby | G01V 1/50 367/31 |

(Continued)

FOREIGN PATENT DOCUMENTS

WO     2016073003 A1    12/2016

OTHER PUBLICATIONS

Endo, T., Tezuka, K., Fukushima, T., Brie, A., Mikado, H., and Miyairi, M., Fracture Evaluation from Inversion of Stoneley Transmission and Reflections, Proceedings of SEGJ International Symposium. (8 pages). (Year: 1998).*

(Continued)

*Primary Examiner* — Ian J Lobo
(74) *Attorney, Agent, or Firm* — Polsinelli PC

(57) ABSTRACT

A method evaluating borehole subsurface geologies can include receiving a total response signal by a sensor array disposed in a borehole, the response signal represents a pressure wave propagating in the borehole. A secondary signal can be extracted from the total response signal and a depth location for at least one secondary source that corresponds to the secondary signal is determined. An estimated reflectivity response for the secondary signal as a function of frequency is determined and the estimated reflectivity response is inverted to determine the secondary source includes at least one of a potential fracture or a potential washout. The at least one of a fracture conductivity or a washout volume for the secondary source is compared to
(Continued)

one or more borehole images corresponding to the depth location of the secondary source to determine the potential fracture is an actual fracture or the potential washout is an actual washout.

18 Claims, 19 Drawing Sheets

(51) Int. Cl.
  *E21B 47/002* (2012.01)
  *G01V 1/40* (2006.01)
(58) Field of Classification Search
  USPC ...................................... 367/35, 31; 181/105
  See application file for complete search history.

(56) References Cited

U.S. PATENT DOCUMENTS

| | | | |
|---|---|---|---|
| 4,870,627 A * | 9/1989 | Hsu | ........................ G01V 1/50 |
| | | | 367/69 |
| 4,899,319 A * | 2/1990 | Medlin | .................... G01V 1/46 |
| | | | 181/105 |
| 5,616,840 A | 4/1997 | Tang | |
| 6,192,316 B1 | 2/2001 | Hornby | |
| 7,100,688 B2 * | 9/2006 | Stephenson | .............. G01V 1/50 |
| | | | 166/250.1 |
| 10,295,692 B2 * | 5/2019 | Cavin | .................... G01V 1/301 |
| 2011/0267922 A1 * | 11/2011 | Shampine | ............. E21B 47/005 |
| | | | 367/25 |
| 2014/0056101 A1 | 2/2014 | Vu et al. | |
| 2016/0291189 A1 | 10/2016 | Collins | |

OTHER PUBLICATIONS

B.E. Hornby, D.L. Johnson, K.W. Winkler, R. A. Plumb, Fracture evaluation using reflected Stoneley-wave arrivals, Geophysics, vol. 54, No. 10 (Oct. 1989); p. 1274-1288.

B.E. Hornby, J. A. Lorsong, R. Wydrinski, A. R. Vittachi; Intergrated Fracture Analysis Using Borehole Geophysical Techniques: Rhourde El Baguel, Algeria; SPWLA 40th Annual Logging Symposium, May 30-Jun. 3, 1999.

Kostek, et al., 1998, The interaction of tube waves with borehole fractures, Part I: Numerical models. Geophysics, 63(3), 800-808.

Kostek, et al., 1998, The interaction of tube waves with borehole fractures, Part II: Analytical models, Geophysics May 1998, vol. 63, No. 3, pp. 809-815.

X. M. Tang and A. Cheng, Quantitative Borehole Acoustic Methods, Handbook of Geophysical Exploration vol. 24, 2004.

International Search Report and Written Opinion; PCT Application No. PCT/US2017/064007; dated Mar. 27, 2018.

* cited by examiner

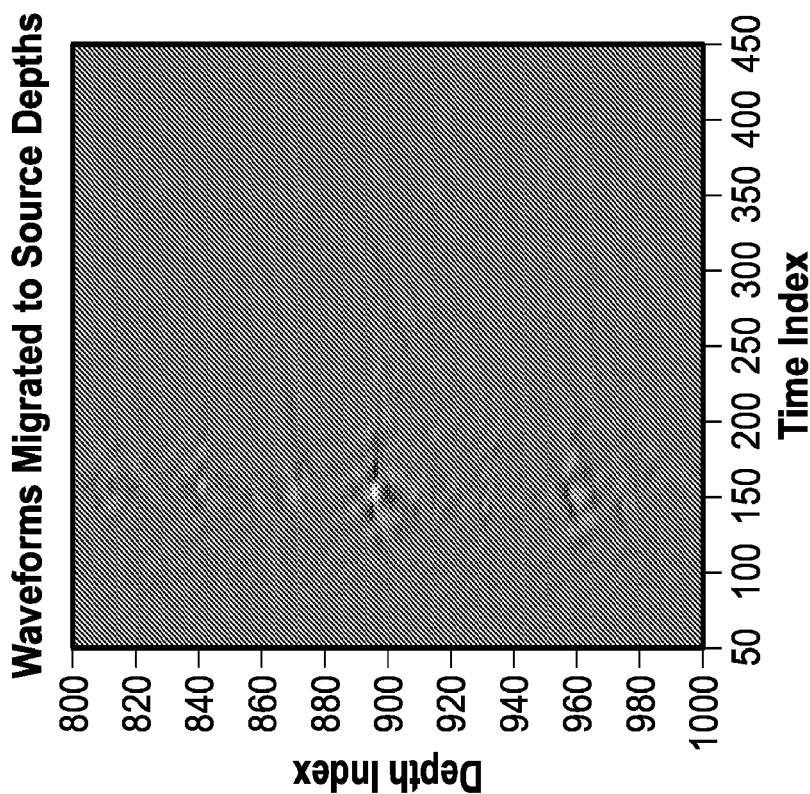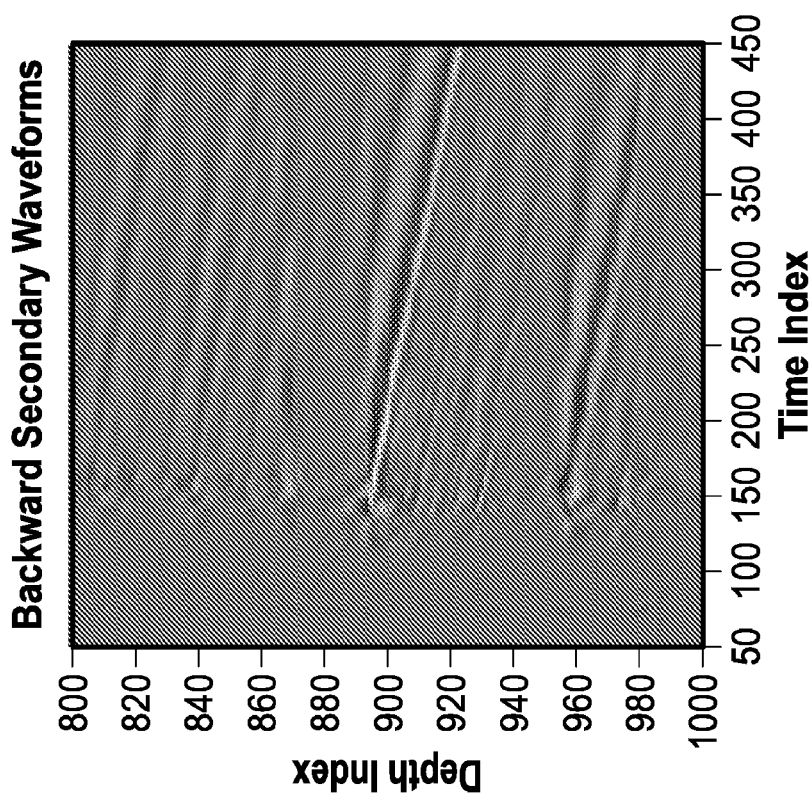
FIG. 9

US 11,261,721 B2

TECHNIQUES FOR EVALUATING BOREHOLE SUBSURFACE GEOLOGIES USING STONELEY WAVES

CROSS-REFERENCE TO RELATED APPLICATIONS

This application is a national stage entry of PCT/US2017/064007 filed Nov. 30, 2017, which claims the benefit of U.S. Provisional application number No. 62/440,605 filed Dec. 30, 2016, each of said applications being expressly incorporated herein in their entirety.

TECHNICAL FIELD

The present technology pertains to geophysical prospecting, and more specifically to evaluating borehole subsurface geologies using sonic signals such as Stoneley waves.

BACKGROUND

In the field of oil and gas prospecting and production, geophysical well logging is a common method for obtaining information about subsurface geologies in the vicinity of a borehole or a wellbore, both during and after the drilling process. Logging tools are often equipped with acoustic or sonic components to generate disturbances such as pressure pulses or sonic waves (e.g., Stoneley waves, etc.) in the borehole as well as sensors to detect and measure propagation of the disturbances (e.g., reflections, etc.) through earth materials in/around the borehole. Often, however, analysis of these disturbances only provide basic estimations of the subsurface geology, which lack granularity that may help avoid potential issues associated with drilling and borehole stability.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 9 is a graph of exemplary log tracks resulting from a migration of field data backward waves to their source depths for a receiver;

DETAILED DESCRIPTION

Figure 1A:
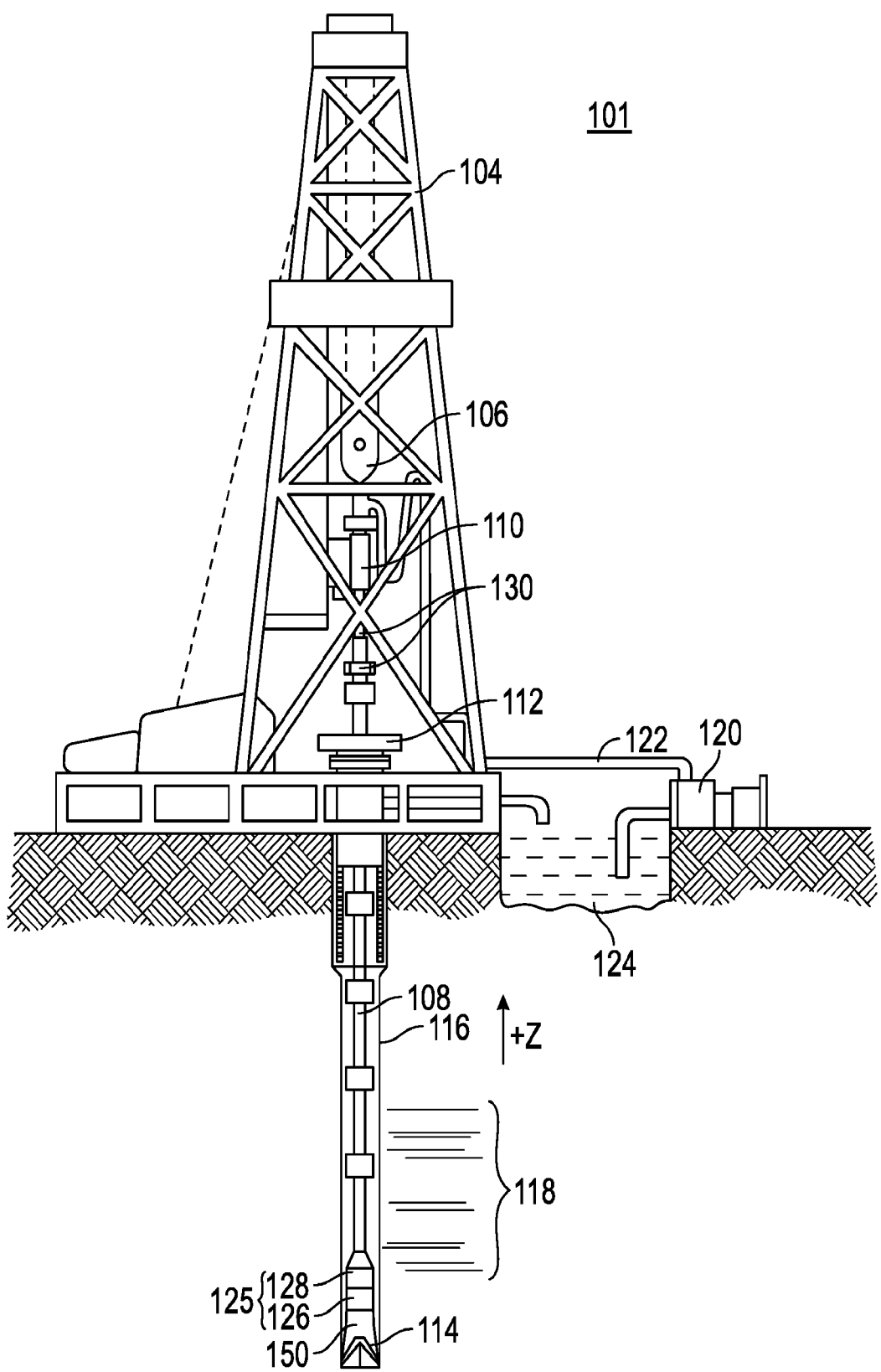
FIG. 1A illustrates a schematic diagram of a wellbore environment, showing logging while drilling (LWD) operations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Several definitions that apply throughout this disclosure will now be presented. "Coupled" refers to the linking or connection of two objects. The coupling can be direct or indirect. An indirect coupling includes connecting two objects through one or more intermediary objects. Coupling can also refer to electrical or mechanical connections. Coupling can also include magnetic linking without physical contact. The term "comprising" means "including, but not necessarily limited to"; it specifically indicates open-ended inclusion or membership in a so-described combination, group, series and the like. "About" refers to almost, nearly, on the verge of, or without significant deviation from the numeric representation.

This disclosure provides techniques for locating and estimating conductivity of fractures crossing a borehole using Stoneley waves recorded by acoustic sensors of a logging tool (e.g., a sonic logging tool). According to the embodiments discussed in greater detail below, the logging tool generates Stoneley waves and detects Stoneley wave responses in a granular fashion so as to discriminate between conductive fractures and borehole size changes and/or lithology changes. In addition, the derived Stoneley wave signal can be used to estimate a volumetric size of borehole break-outs or other size changes, which can impact other well operations such as cementing or geomechanical property estimation. For geomechanics, knowing the size of a borehole breakout can impact decisions on mud weight and may help avoid problems associated with drilling and borehole instability stemming from in-situ rock stress imbalance.

For example, the techniques discussed herein determine whether a fracture (e.g., an inducted fracture, etc.) is conductive or not. The term conductive, with reference to fractures, generally refers to conducting fluids from a reservoir, and typically does not include local borehole features. Moreover, these techniques may be used to compliment and/or integrated with other borehole imaging technologies—for example, a borehole imaging device can locate fractures and other features crossing a wellbore while the techniques disclosed herein may further inform operators if the fractures or other features are conductive or not. However, these techniques may also be independently implemented to evaluate fractures.

With reference to the figures, FIG. 1A provides a schematic diagram of a wellbore environment 101, particularly showing logging while drilling (LWD) operations, in which the presently disclosed techniques may be deployed. As depicted, wellbore environment 101 includes a drilling platform 102 equipped with a derrick 104 that supports a hoist 106 for raising and lowering a drill string 108. Hoist 106 suspends a top drive 110 suitable for rotating the drill string 108 and lowering drill string 108 through a well head 112. Connected to a lower end of drill string 108 is a drill bit 114. As drill bit 114 rotates, drill bit 114 creates a wellbore 116 that passes through various formations 118. A pump 120 circulates drilling fluid through a supply pipe 122 to top drive 110, down through an interior of drill string 108, through orifices in drill bit 114, back to the surface via an annulus around drill string 108, and into a retention pit 124. The drilling fluid transports cuttings from wellbore 116 into pit 124 and aids in maintaining the integrity of wellbore 116. Various materials can be used for drilling fluid, including oil-based fluids and water-based fluids.

Logging tools 126 can be integrated into a bottom-hole assembly 125 near drill bit 114. As drill bit 114 extends wellbore 116 through subsurface formations 118, logging tools 126 collect measurements relating to various formation properties as well as the orientation of the tool and various other drilling conditions. A bottom-hole assembly 125 may also include a telemetry sub 128 to transfer measurement data to a surface receiver 130 and to receive commands from the surface. In at least some cases, telemetry sub 128 communicates with a surface receiver 130 using mud pulse telemetry. In some instances, telemetry sub 128 does not communicate with the surface, but rather stores logging data for later retrieval at the surface when the logging assembly is recovered.

Each of logging tools 126 may include a plurality of tool components, spaced apart from each other, and communicatively coupled with one or more wires. Logging tools 126 may also include one or more computing devices 150 communicatively coupled with one or more of the plurality of tool components by one or more wires. A computing device 150 may be configured to control or monitor the performance of the tool, process logging data, and/or carry out the methods of the present disclosure.

In at least some instances, one or more of logging tools 126 may communicate with a surface receiver 130 by a wire, such as wired drillpipe. In other cases, the one or more of logging tools 126 may communicate with a surface receiver 130 by wireless signal transmission. In at least some cases, one or more of logging tools 126 may receive electrical power from a wire that extends to the surface, including wires extending through a wired drillpipe. In at least some instances the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Figure 1B:
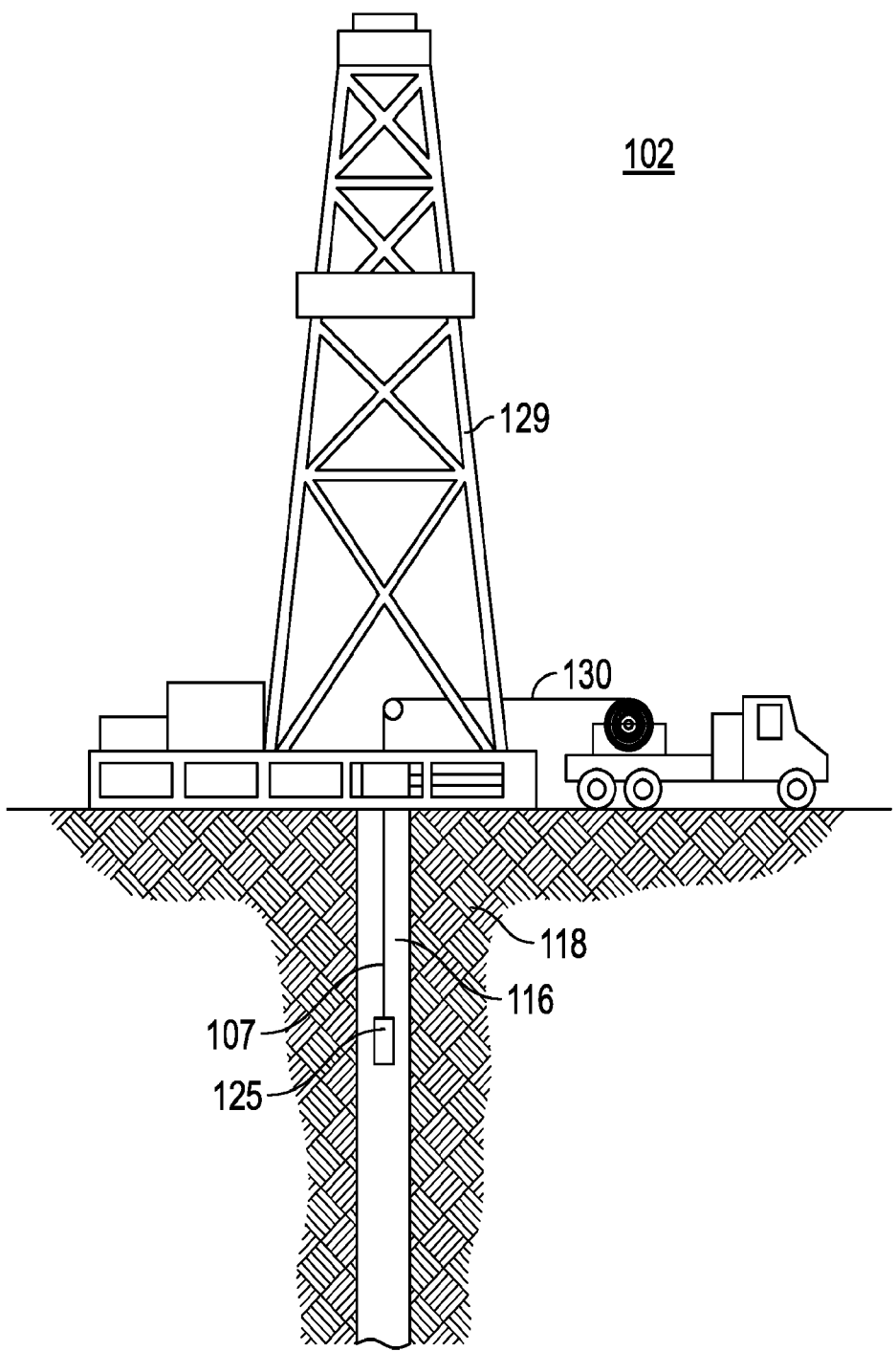
FIG. 1B is a schematic diagram of a wellbore environment, showing a downhole line detection operations.

FIG. 1B provides another schematic diagram of conveyance logging wellbore operating environment 102, also referred to in the field as "wireline." For example, instead of using drill string 108 of FIG. 1A to lower tool body 110, which may contain sensors or other instrumentation for detecting and logging nearby characteristics and conditions of the wellbore and surrounding formation, the logging tool 125 can be lowered into the wellbore 116 by a conveyance 130 as shown in FIG. 1B. Notably, conveyance 130 can be anchored in drill rig 129 or by other portable means such as a truck. Conveyance 130 can include one or more wires, slicklines, cables, or the like, as well as tubular conveyances such as coiled tubing, joint tubing, or other tubulars and may include a downhole tractor. Further, conveyance 130 provides support for logging tool 125 such as communication between local and remote tool processors (e.g., fiber optic cabling, etc.) and power. When employing non-conductive conveyances, such as cable, coiled tubing, pipe string, or downhole tractor, communication may be supported using, for example, wireless protocols (e.g. EM, acoustic, etc.), and/or measurements and logging data may be stored in local memory for subsequent retrieval. For slickline or coiled tubing configurations, power can be supplied downhole with a battery or via a downhole generator.

In operation, subsurface formation 118 is traversed by a borehole 116, which may be filled with drilling fluid or mud (not shown). Logging tool 125 is lowered into borehole 116 by a cable 107. As discussed, cable 107 connects to surface equipment (not shown) such as sheave wheels, derricks, winches, and the like, which operate to control descent/ascent of logging tool 125 through borehole 104. In addition, cable 107 may include electrical wiring and other electrical components that facilitates communication between logging tool 125 and the surface equipment. In addition, in also appreciated logging tool 125 may be configured for wireless communications. In this fashion, logging tool 125 may be equipped with various types of electronic sensors, transmitters, receivers, hardware, software, and/or additional interface circuitry for generating, transmitting, and detecting signals (e.g., sonic waves, etc.), storing information (e.g., log data), communicating with additional equipment (e.g., surface equipment, processors, memory, clocks, input/output circuitry, etc.), and the like. It is appreciated by those skilled in the art various types of logging tools/devices may be used in conjunction with the techniques disclosed herein and that the environments shown in FIGS. 1A and 1B are provided as examples for discussion, not limitation.

Figure 2:
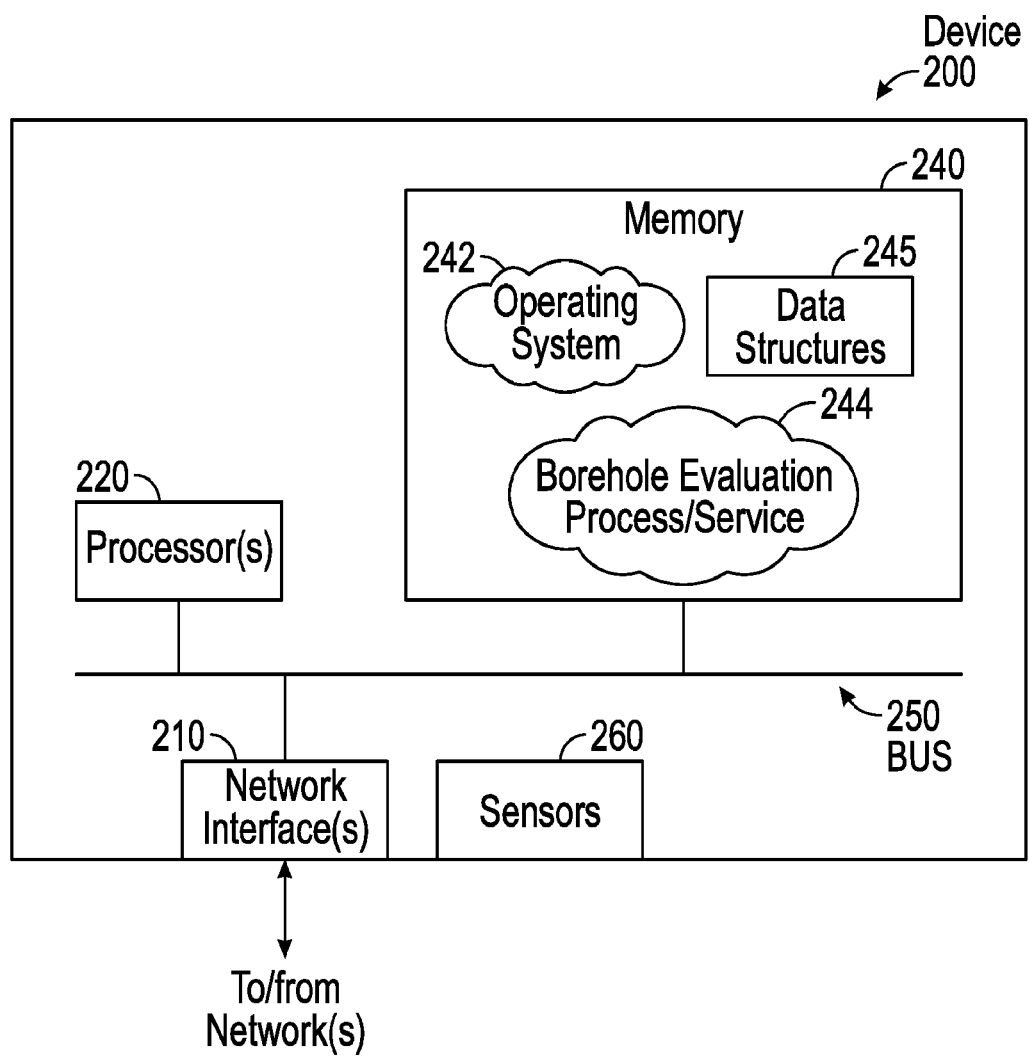
FIG. 2 is a schematic diagram of an exemplary computing device.

FIG. 2 is a block diagram of an exemplary computing device 200, which can represent one or more logging tools (e.g., logging tool(s) 125). Operatively, device 200 is configured to perform the borehole techniques discussed herein. Device 200 is merely an example shown for purpose of discussion, not limitation, and it is appreciated various types of devices, individually and/or a distributed network of devices, may be used to perform the borehole techniques discussed herein.

As shown, device 200 includes various hardware and software components such as network interfaces 210, at least one processor 220, sensors 260 and a memory 240 interconnected by a system bus 250. Network interface(s) 210 include mechanical, electrical, and signaling circuitry for communicating data over links (e.g., cable 107 shown in FIG. 1B). Further, network interfaces 210 may be configured to transmit and/or receive data using a variety of different communication protocols, as will be understood by those skilled in the art.

Processor 220 represents a digital signal processor (e.g., a microprocessor, a microcontroller, or a fixed-logic processor, etc.) configured to execute instructions or logic to perform tasks in a wellbore environment. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260 typically operate in conjunction with processor 220 to perform wellbore measurements, and can include special-purpose processors, detectors, transmitters, receivers, and the like. In this fashion, sensors 260 may include hardware/software for generating, transmitting, receiving, logging, and/or sampling acoustic or sonic waves such as Stoneley waves.

Memory 240 comprises a plurality of storage locations that are addressable by processor 220 for storing software programs and data structures 245 associated with the embodiments described herein. An operating system 242, portions of which are typically resident in memory 240 and executed by processor 220, functionally organizes the device by, inter alia, invoking operations in support of software processes and/or services executing on device 200. These software processes and/or services may comprise an illustrative "borehole evaluation" process/service 244, as described herein. Note that while process/service 244 is shown in centralized memory 240, some embodiments provide for these processes/services to be operated in a distributed computing network.

It will be apparent to those skilled in the art that other processor and memory types, including various computer-readable media, may be used to store and execute program instructions pertaining to the borehole evaluation techniques described herein. Also, while the description illustrates various processes, it is expressly contemplated that various processes may be embodied as modules having portions of the borehole evaluation process 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 200 that, when executed by the processor, are operable to cause the processor to perform the functions described herein.

As discussed above, typical borehole evaluations often only provide basic or rudimentary evaluations of subsurface geology and often lack granularity needed to determine borehole size changes, lithology changes, estimates of volumetric size of borehole break-outs, and the like. Accordingly, the techniques disclosed herein provide more granular fracture and borehole evaluations, which can help avoid problems associated with drilling and borehole instability (e.g., due to in-situ rock stress imbalances, etc.).

Stoneley waves are generally excited in a fluid-filled borehole by, for example, borehole sonic tools firing a monopole transmitter. A Stoneley wave is a fundamental borehole mode and a large percentage (90% or so) of the source energy will drive this wave. Operatively, the Stoneley wave is received by an array of pressure sensitive sensors located on the sonic tool some distance from the source. Borehole Stoneley waves are typically sensitive to conductive fractures crossing a borehole. For this purpose the Stoneley wave can, in effect, be considered to be a simple pressure pulse propagating up the borehole. When this pressure pulse encounters a conductive fracture, pressure is released into the fracture, and this pressure change creates a secondary source that excites a new, or secondary, Stoneley wave. This secondary Stoneley wave is then received by the array of receivers. Notably, although this signal is commonly referred in the literature to be a "reflected Stoneley wave arrival", in the case of a conductive fracture it is not, in fact, reflected but the result of a pressure pulse that is generated due to pressure release into the fracture as described above. Further, secondary Stoneley wave responses directly depend on the conductivity of the fracture and the magnitude of this response can be used to estimate the fracture conductivity. In addition, Stoneley waves are sensitive to borehole size and bedding changes. These responses need to be discriminated in order to have a reliable estimate of fracture conductivity and location. As described in greater detail herein, the techniques provided estimate fracture location and conductivity, and also discriminate other borehole effects such as volume changes and bedding changes. Notably, the Stoneley wave fracture response typically depends on the fracture extending some distance into the formation, and so this technique can be considered to be "probing the fractures beyond the borehole". And so these techniques complement other borehole imaging techniques, which give a high-resolution image of the borehole wall and indicate the presence and geometry of fractures and other features crossing the borehole.

Figure 3:
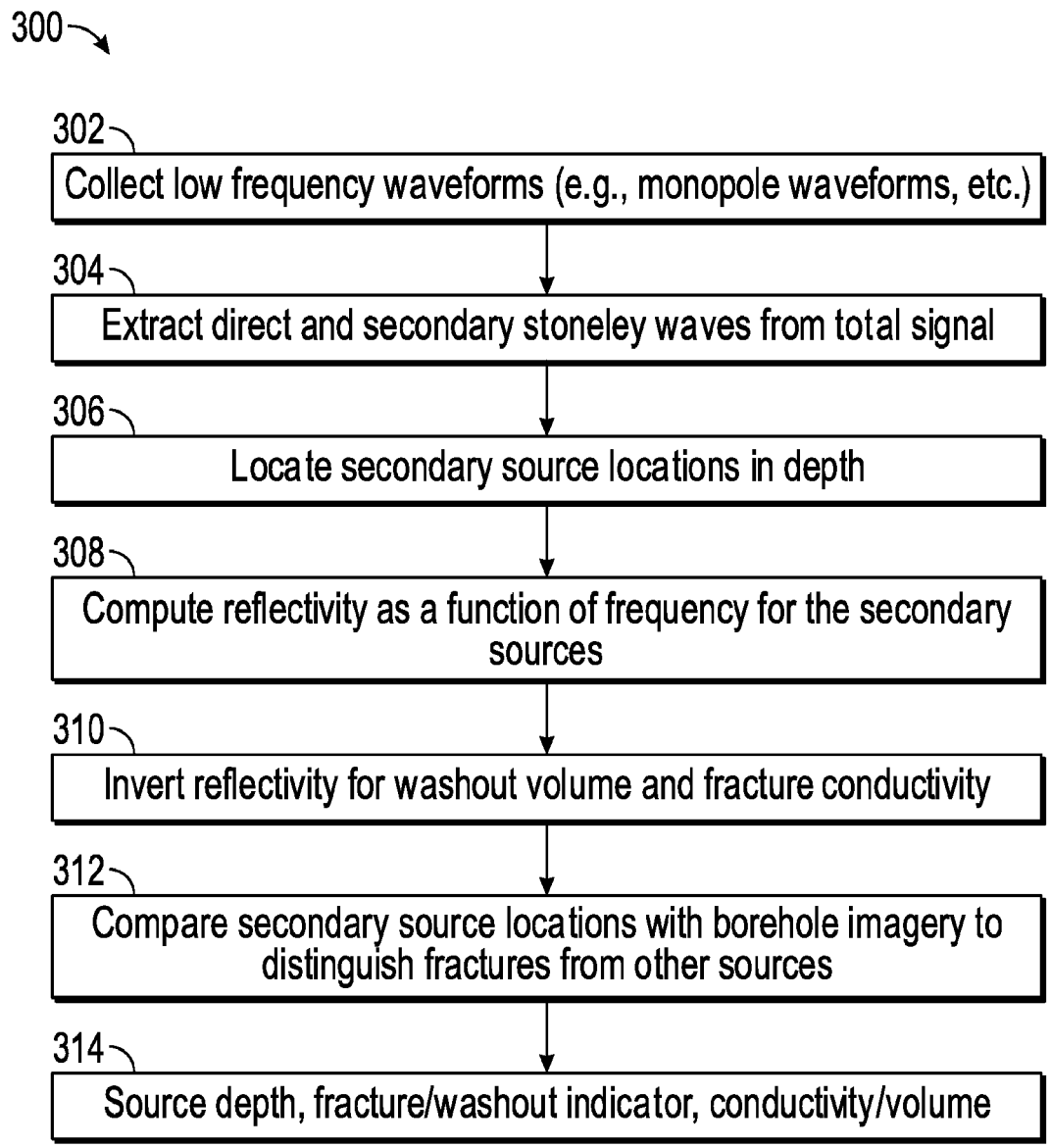
FIG. 3 is an example flowchart of a procedure for estimating of fracture conductivity and/or washout volume in a borehole.

FIG. 3 is an example flow chart of a procedure for estimating fracture conductivity and/or washout volume in a borehole, according to the borehole evaluation techniques of this disclosure. Each block shown in FIG. 3 represents one or more processes, methods, or subroutines, carried out in the example process 300. The order of blocks is illustrative only and the other of the blocks can change according to the present disclosure, and additional blocks may be added or fewer blocks may be utilized, without departing from this disclosure. At block 302, a total wave signal including low frequency wave forms (e.g. monopole waveforms, etc.) can be collected. At block 304, first direct and secondary Stoneley waves are extracted from the total signal. Here known time domain wave stacking methods can be employed, or frequency domain L2 norm methods can be used for this step. At block 306, borehole depth locations of the secondary sources (conductive fracture, borehole washout, bedding) are located. A variety of approaches can be employed for this step, and we are not limited to the approaches detailed below. At block 308, the reflectivity response of the secondary source is estimated as a function of frequency, and at block 310, an inversion procedure is used to determine effective fracture conductivity and washout volumes, where they occur. At block 312, the secondary source depth locations can be compared with borehole images to further distinguish the fractures from other sources (e.g. bedding). At block 314, source depth, fracture and/or washout indicator, conductivity and/or volume can be determined. Notably, the borehole images may be taken from any number of imaging technologies known to those skilled in the art (e.g., optical images, acoustic images, magnetic resonance images (MRI), X-tended Range Micro Imager (XRMI™) images, Circumferential Acoustic Scanning Tool (CAST™) images, and the like). Each of these steps is described in more detail below.

Direct and Secondary Wave Extraction

As noted above there are many methods for separating direct waves from secondary wave arrivals. For example, FIG. 4A is an example flow chart of a procedure 401 for separating direct waves from secondary waves (e.g., similar to known time based stacking methods) and FIG. 4B is an example flow chart of a procedure 402 for separating backward and forward traveling secondary waves.

Figure 4A:
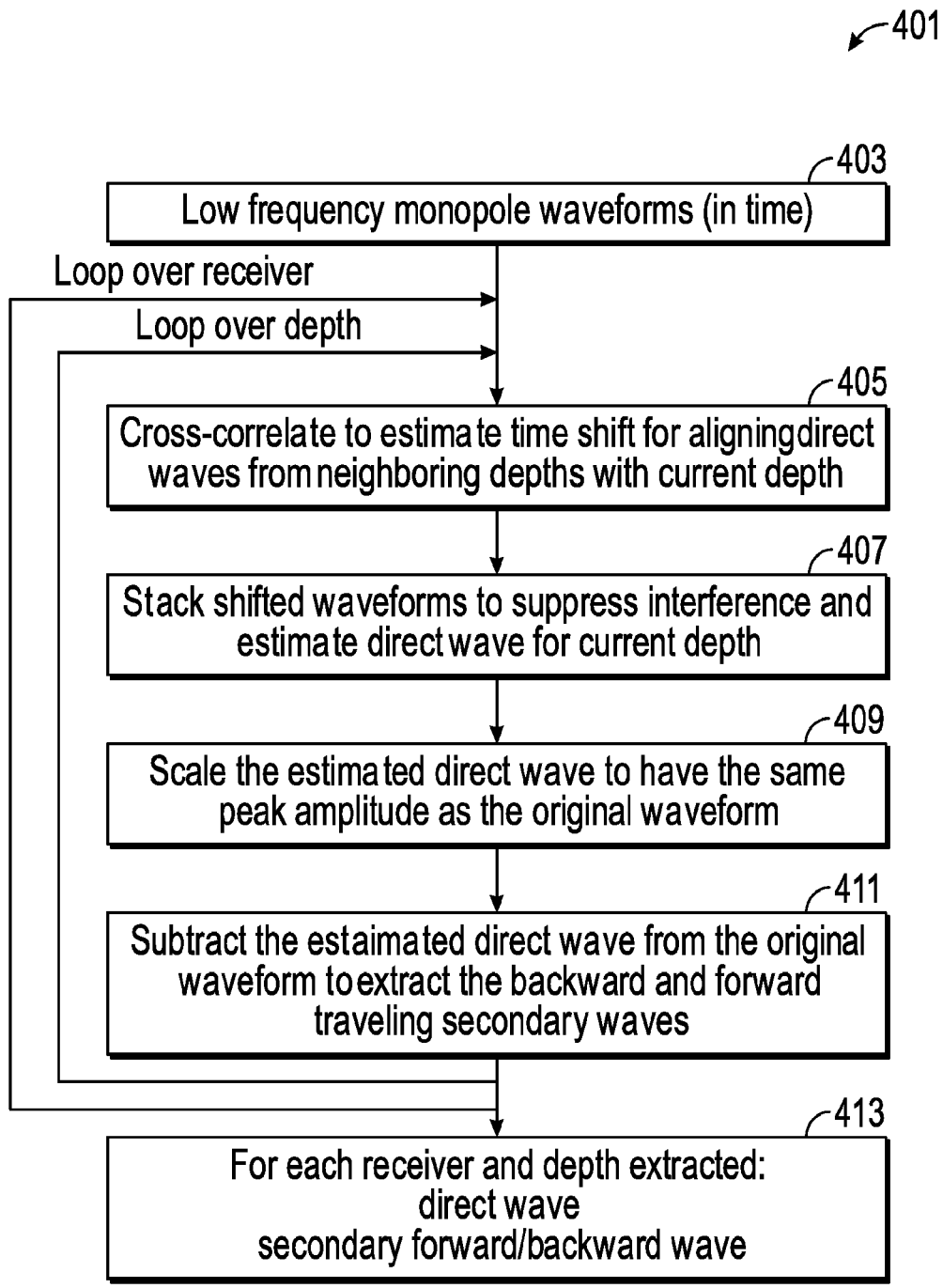
FIG. 4A is an example flowchart of a procedure for separating direct waves from secondary waves.

Referring to procedure 401, each block shown in FIG. 4A represents one or more processes, methods, or subroutines, carried out in the example process 401. The order of blocks is illustrative only and the other of the blocks can change according to the present disclosure, and additional blocks may be added or fewer blocks may be utilized, without departing from this disclosure. At block 403, low frequency monopole wave forms (in time) can be collected. At block 405, cross-correlation of the total waveform at a current depth for a given receiver with the total waveforms at neighboring depths for the same receiver is used to estimate the required time shifts to align the direct wave arrival across the depths. At block 407, the time shifted waveforms are stacked to reduce the secondary wave amplitudes and, at block 409, estimate the direct wave. At block 411, the direct wave is subtracted from the total signal to extract the secondary waves. The process can be looped over each receiver, or looped over each depth, and returning to block 405. At block 413, for each receiver and each depth extracted a direct wave and a secondary forward/backward way can be determined.

Figure 4B:
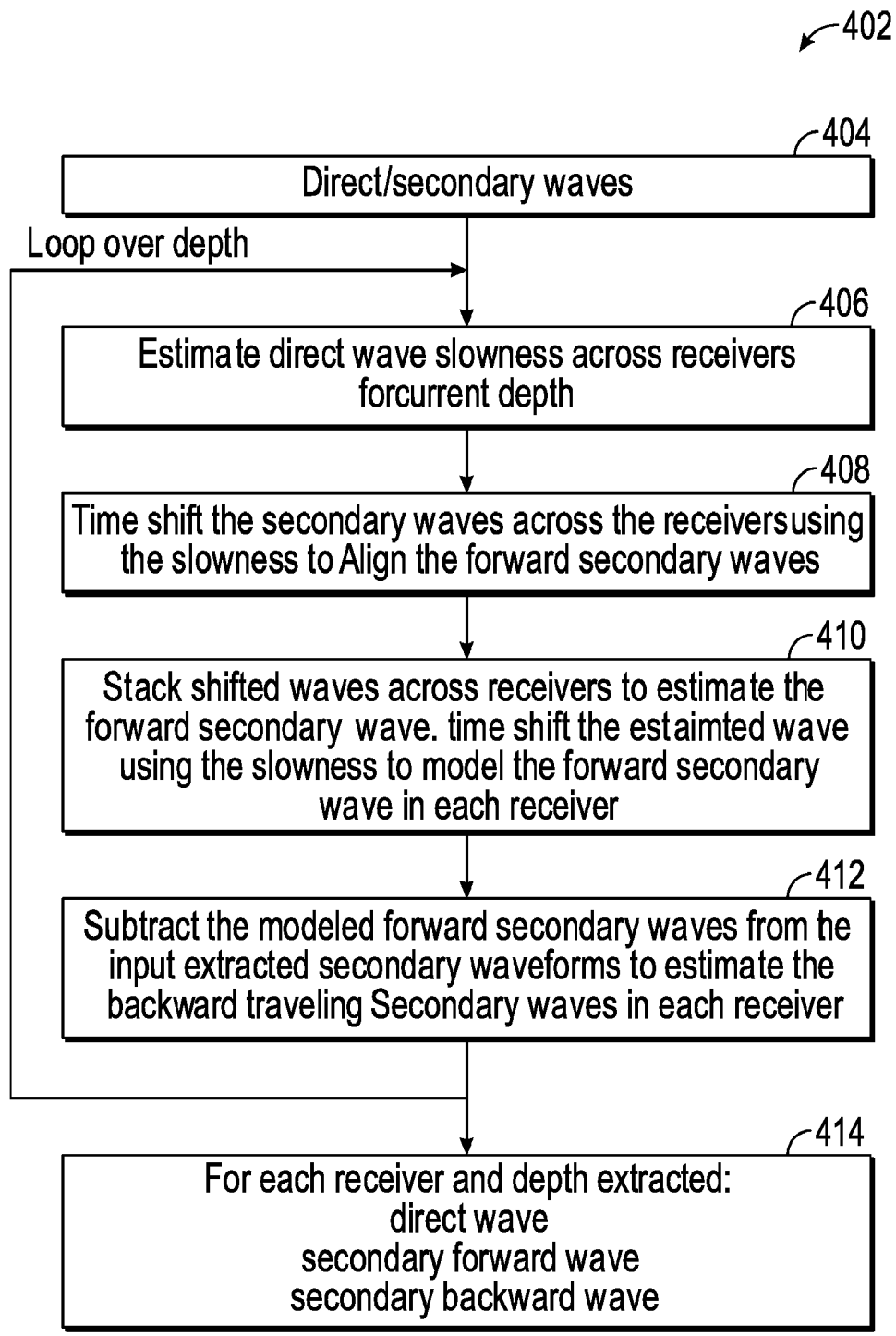
FIG. 4B is an example flowchart of a procedure for separating backward and forward traveling secondary waves.

As shown in procedure 402, each block shown in FIG. 4B represents one or more processes, methods, or subroutines, carried out in the example process 402. The order of blocks is illustrative only and the other of the blocks can change according to the present disclosure, and additional blocks may be added or fewer blocks may be utilized, without departing from this disclosure. At block 404, secondary waves are further processed to separate the backward and forward travelling secondary waves from each other. At block 406, the direct wave slowness is estimated across the receiver array for a given depth. At block 408, the slowness is used to time shift the secondary waves such that the forward waves are aligned. At block 410, the shifted waves are stacked across the receivers to extract a forward secondary wave at the middle of the receiver array. The forward wave is then shifted back to its original position in each receiver. At block 412, the forward wave in each receiver is then subtracted from the input secondary waveform to extract the backward secondary wave in each receiver. The process 402 can then be looped over each depth returning to block 406. At block 414, for each receiver and depth extracted, process 402 produces a direct wave, a secondary forward wave, and a secondary backward wave.

Figure 5:
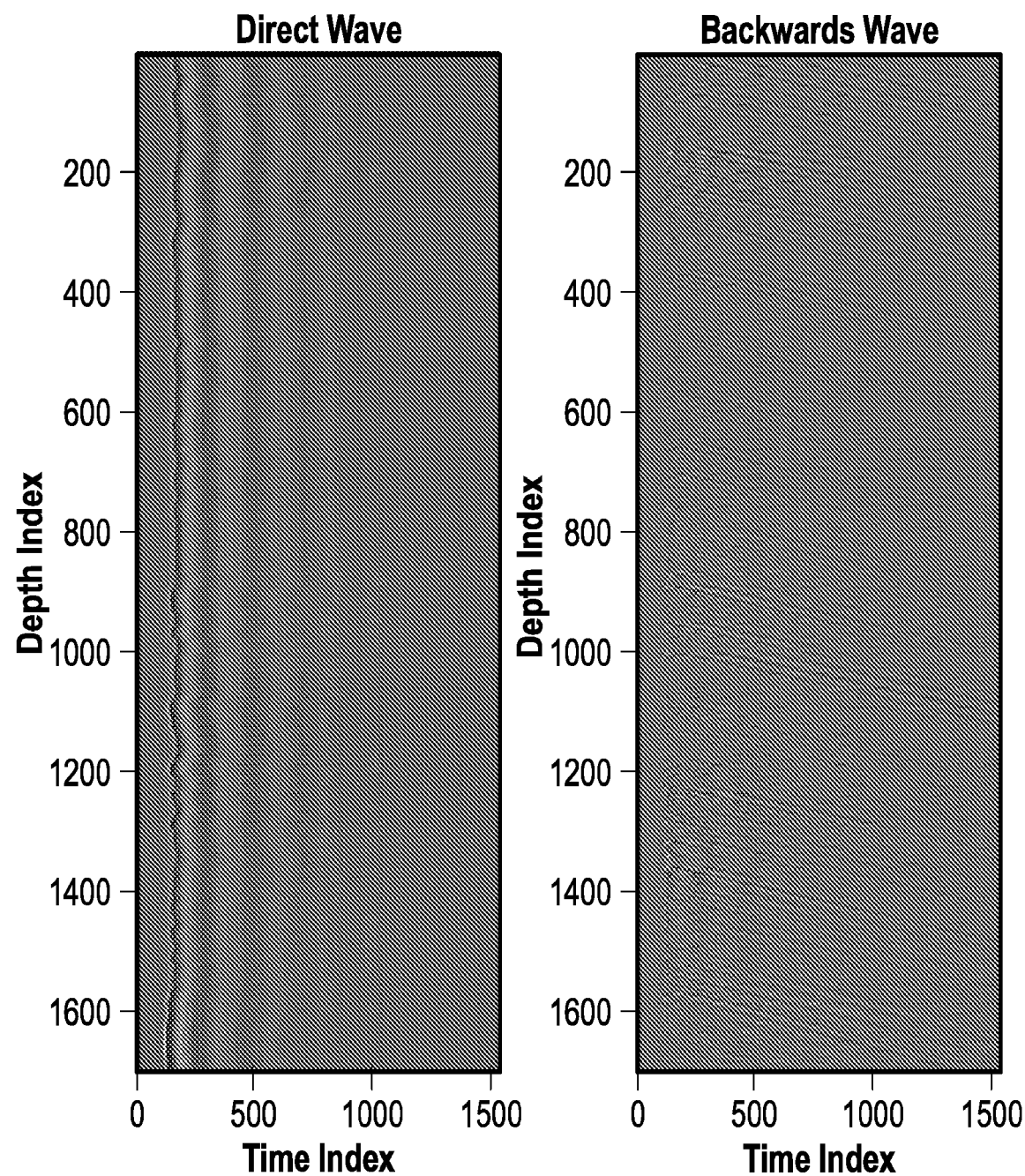
FIG. 5 is a graph of exemplary extracted wave log tracks for a single receiver, showing direct wave and backward secondary source log tracks.

For example, FIG. 5 is a graph showing an example wave log track for a single receiver, showing direct wave and backward secondary source log tracks. As shown, the stacking represents a filtering method and reduces noise or the interference between extracted waves. The extracted backward wave has a sharp resolution because the stacking was used to estimate the forward wave and subtract it, leaving the backward wave unperturbed. Similarly, this processing may be reversed to extract a sharply resolved forward wave.

A second embodiment for extracting the direct, secondary forward, and secondary backward waves models the waveforms in the frequency domain. The assumed waveform model is given as:

$$\begin{bmatrix} Z_{11}(\omega) & \cdots & Z_{1K}(\omega) \\ \vdots & \vdots & \vdots \\ Z_{M1}(\omega) & \cdots & Z_{MK}(\omega) \end{bmatrix} \begin{bmatrix} h_1(\omega) \\ \vdots \\ h_K(\omega) \end{bmatrix} = Z\vec{h} = \vec{W} = \begin{bmatrix} W_1(\omega) \\ \vdots \\ W_M(\omega) \end{bmatrix} \quad (1)$$

Where Z is an M×K array as a function of angular frequency, $\omega=2\pi f$. M is the number of recorded waveforms and K is the number of distinct extracted waves (e.g. direct, secondary forward, and secondary backwards). $\vec{W}$ is the waveform vector of length M In one realization the waveform vector may be a 2D receiver/depth stack of length $M=N_r \times N_d$ where $N_r$ is the number of receivers and $N_d$ is the number of depths. $\vec{h}$ the extracted frequency response vector of length K. Each element of $\vec{h}$ is the frequency response for the k'th extracted wave referenced to the receiver/depth 'center' of the waveform vector. The k'th column of Z is the length M steering vector for the k'th extracted wave, $$Z_{:,k} = \begin{bmatrix} \exp[j\omega(s_{kr}(0-\overline{m})dz + s_{kd}(d_0 - \overline{d}))] \\ \exp[j\omega(s_{kr}(1-\overline{m})dz + s_{kd}(d_0 - \overline{d}))] \\ \vdots \\ \exp[j\omega(s_{kr}(N_r-1-\overline{m})dz + s_{kd}(d_0 - \overline{d}))] \\ \exp[j\omega(s_{kr}(0-\overline{m})dz + s_{kd}(d_1 - \overline{d}))] \\ \exp[j\omega(s_{kr}(1-\overline{m})dz + s_{kd}(d_1 - \overline{d}))] \\ \vdots \\ \exp[j\omega(s_{kr}(N_r-1-\overline{m})dz + s_{kd}(d_1 - \overline{d}))] \\ \vdots \\ \exp[j\omega(s_{kr}(0-\overline{m})dz + s_{kd}(d_{N_d-1} - \overline{d}))] \\ \exp[j\omega(s_{kr}(1-\overline{m})dz + s_{kd}(d_{N_d-1} - \overline{d}))] \\ \vdots \\ \exp[j\omega(s_{kr}(N_r-1-\overline{m})dz + s_{kd}(d_{N_d-1} - \overline{d}))] \end{bmatrix} \quad (2)$$

Where $s_{kr}$ and $s_{kd}$ are the slownesses along the receiver and depth dimensions respectively for the k'th extracted wave. $\overline{m}$ and $\overline{d}$ are the center receiver index and center depth respectively. Note neither the depths or receiver spacing need be uniform. However, a uniform receiver spacing, dz, is assumed in equation (2) since this is standard for acoustic tools in the well logging industry. If the slownesses are known the solution to the optimization model is:

$$\bar{h}(\omega)=[Z^H(\omega)Z(\omega)]^{-1}Z^H(\omega)\overline{W}(\omega) \quad (3)$$

Figure 6:
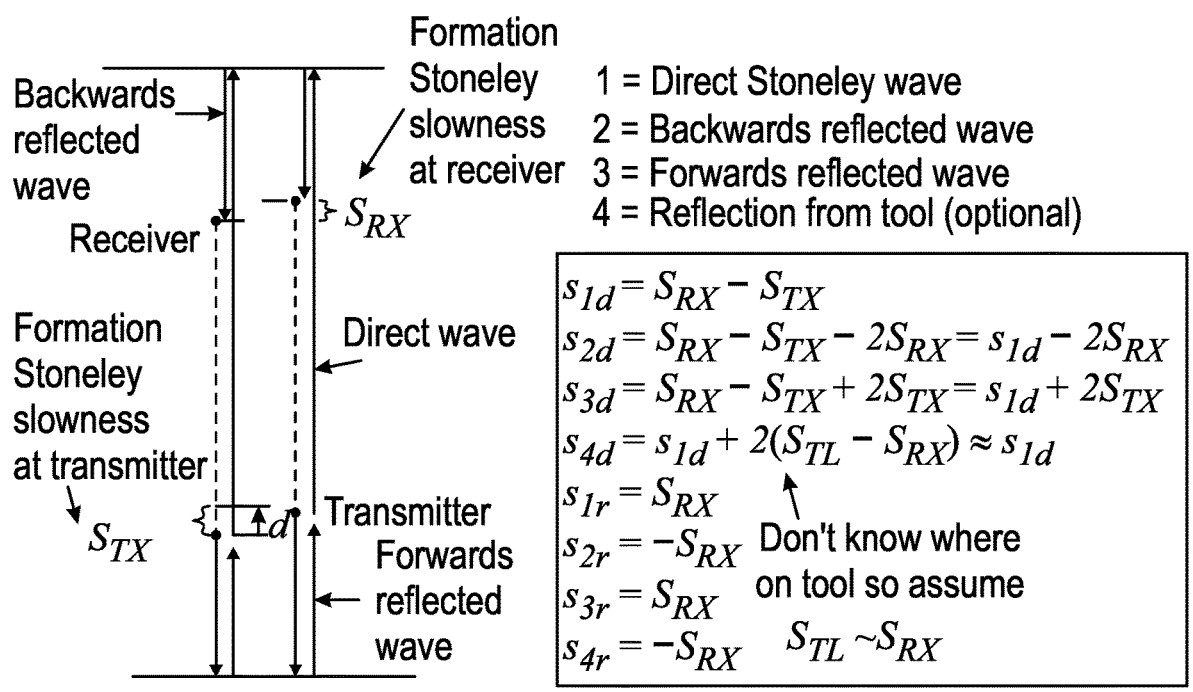
FIG. 6 is a signaling diagram showing a relationship between Stoneley slowness and model slowness.

The slownesses $s_k$, and $s_{kd}$ in equation (2) are related to the Stoneley slowness of the formation. Stoneley slowness may be estimated as a function of depth and frequency from the original waveforms using standard semblance techniques well known to those skilled in the art. Let k=1, 2, 3 be the direct wave, backwards secondary wave from a stationary source, and forwards secondary wave from a stationary source. Let k=4 be an optional backwards secondary source due the impedance contrast caused by the presence of the tool in the borehole. This source travels with the tool. For example, FIG. 6 is signaling diagram showing tool geometry and a relationship between Stoneley slowness and model slowness. As shown, receivers above the transmitter and depth coordinate increases up the slownesses $s_k$, and $s_{kd}$ are related to the formation Stoneley slowness as:

$$s_{1d}=S_{RX}-S_{TX}$$

$$s_{2d}=S_{RX}-S_{TX}-2S_{RX}=s_{1d}-2S_{RX}$$

$$s_{3d}=S_{RX}-S_{TX}+2S_{TX}=s_{1d}+2S_{TX}$$

$$s_{4d}=s_{1d}+2(S_{TL}-S_{RX})\approx s_{1d} \quad (4)$$

and $$s_{1r}=S_{RX}$$

$$s_{2r}=-S_{RX}$$

$$s_{3r}=S_{RX}$$

$$s_{4r}=-S_{RX} \quad (5)$$

Where $S_{RX}$ is the formation Stoneley slowness at the middle of the receiver array, and $S_{TX}$ is the corresponding Stoneley slowness at the transmitter for the current stack center depth, $\bar{d}$.

Figure 7:
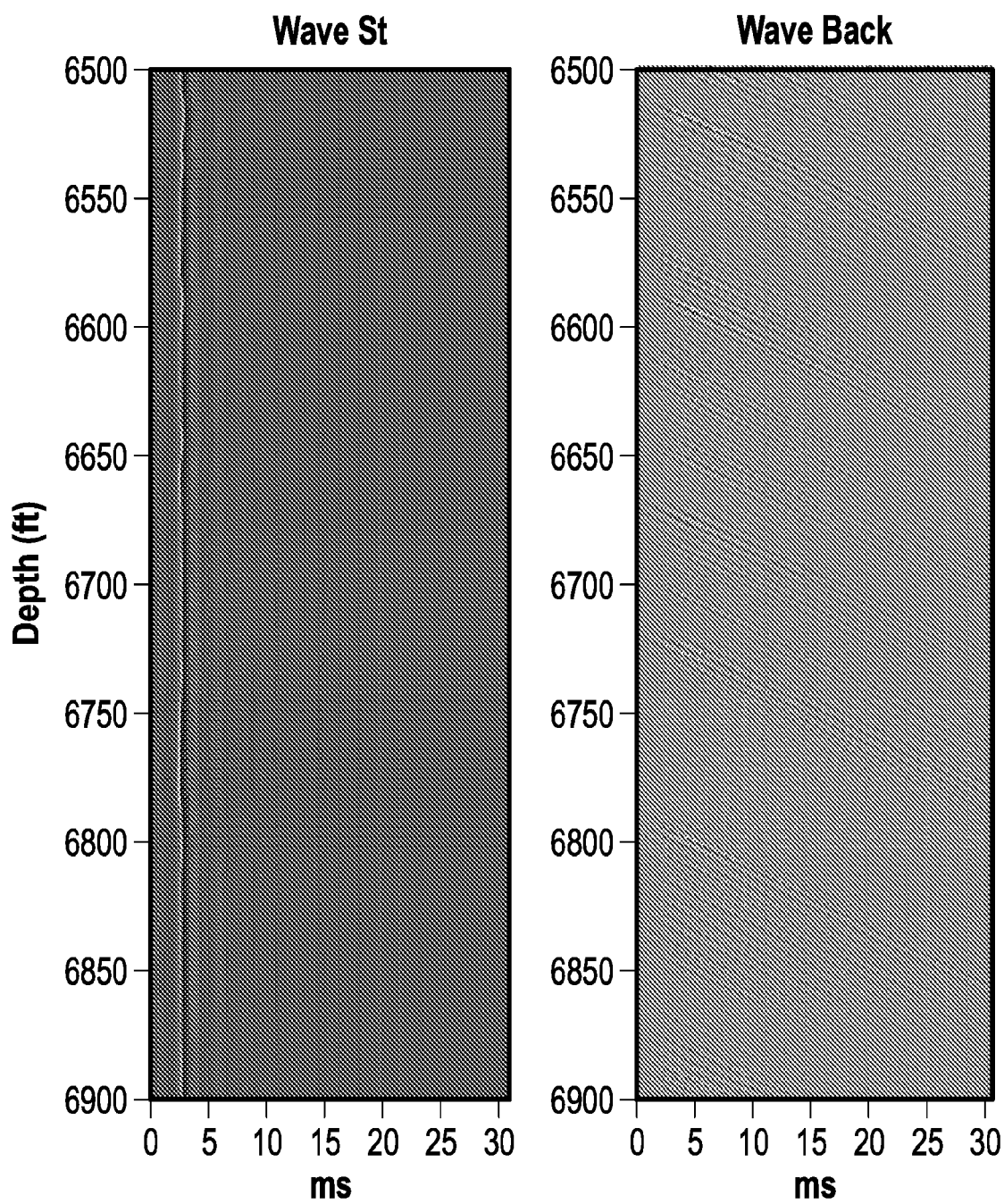
FIG. 7 is a graph of exemplary direct wave and backward secondary source log tracks, according to another embodiment of this disclosure.

The output of the above described wave extraction process results in frequency responses for the extracted waves, $\bar{h}$, as a function of depth. The processing is done over the desired frequency band, and the responses are Fourier transformed to derive band-limited extracted waveforms in the time domain. For example, FIG. 7 is a graph of exemplary direct wave and backward secondary source log tracks, according to a second embodiment of this disclosure. Note this is a modeling method not a filtering method (e.g., ref the first embodiment, discussed above), so there is no residual interference between extracted waves. However, model misfit due to, for example, waveform response variability and errors in slowness estimation may cause the extracted waves to wander slightly. Also note that the backward waves attenuate gradually as time approaches zero unlike in the first embodiment where the backward waves terminate sharply. This gradual attenuation occurs as the waveforms in the 2D stack individually lose their secondary waves when passing by the source.

Although the above discussed embodiments regarding wave extraction have different characteristics, both may be employed by the borehole evaluation techniques described herein. It is also appreciated that those skilled in the art may arrive at many other variations. For example the second embodiment could be modified to extract the backward and forward secondary waves with sharper termination using the following equation (e.g., at a cost of some residual interference between separated waves).

$$W_{BACK} = W - Z \begin{bmatrix} h_1 \\ 0 \\ h_3 \end{bmatrix} \quad (6)$$

$$W_{FORW} = W - Z \begin{bmatrix} h_1 \\ h_2 \\ 0 \end{bmatrix}$$

Notably, the provided wave extraction techniques are provided for purposes of explanation, not limitation. It is appreciated that other types of waveform extraction may be used as appreciate by those skilled in the art.

Secondary Source Depth Location

Once the secondary waves have been extracted it is possible to determine the locations of the secondary sources. As a continuation of the first embodiment one could localize the sources assuming the following model for a backward propagating secondary source at depth d', where depth, d, increases down, $$L(d,d',t)=\theta(d,d')W(d',t-T(d,d')) \quad (7)$$

In equation (7), L is the log track for the backward propagating wave emanating from depth d', θ is the step function, $$\theta(d, d') = \begin{cases} 1 & d \geq d' \\ 0 & d < d' \end{cases} \quad (8)$$

and T is the waveform time delay as the waveform W sourced at d' propagates to depth d. Note the waveform sourced at one depth is independent of the waveform sourced at another depth, and if a depth has no source then W is simply zero at that depth. An arbitrary log track like the ones on the right hand side of FIGS. 3, 5, and 7 is created by simply summing over the source depths, $$L(d, t) = \sum_{d'} \theta(d, d')W(d', t - T(d, d')) \quad (9)$$

Fourier transforming and allowing dispersion gives:

$$L(d, \omega) = \quad (10)$$

$$\sum_{d'} \theta(d, d')\exp[j\omega T(d, d', \omega)]W(d', \omega) \equiv A(d, d')W(d', \omega)$$

Thus the source waveforms at all depths are easily computed from:

$$W(d,\omega)=A^{-1}(d,d')L(d',\omega) \quad (11)$$

Figure 8:
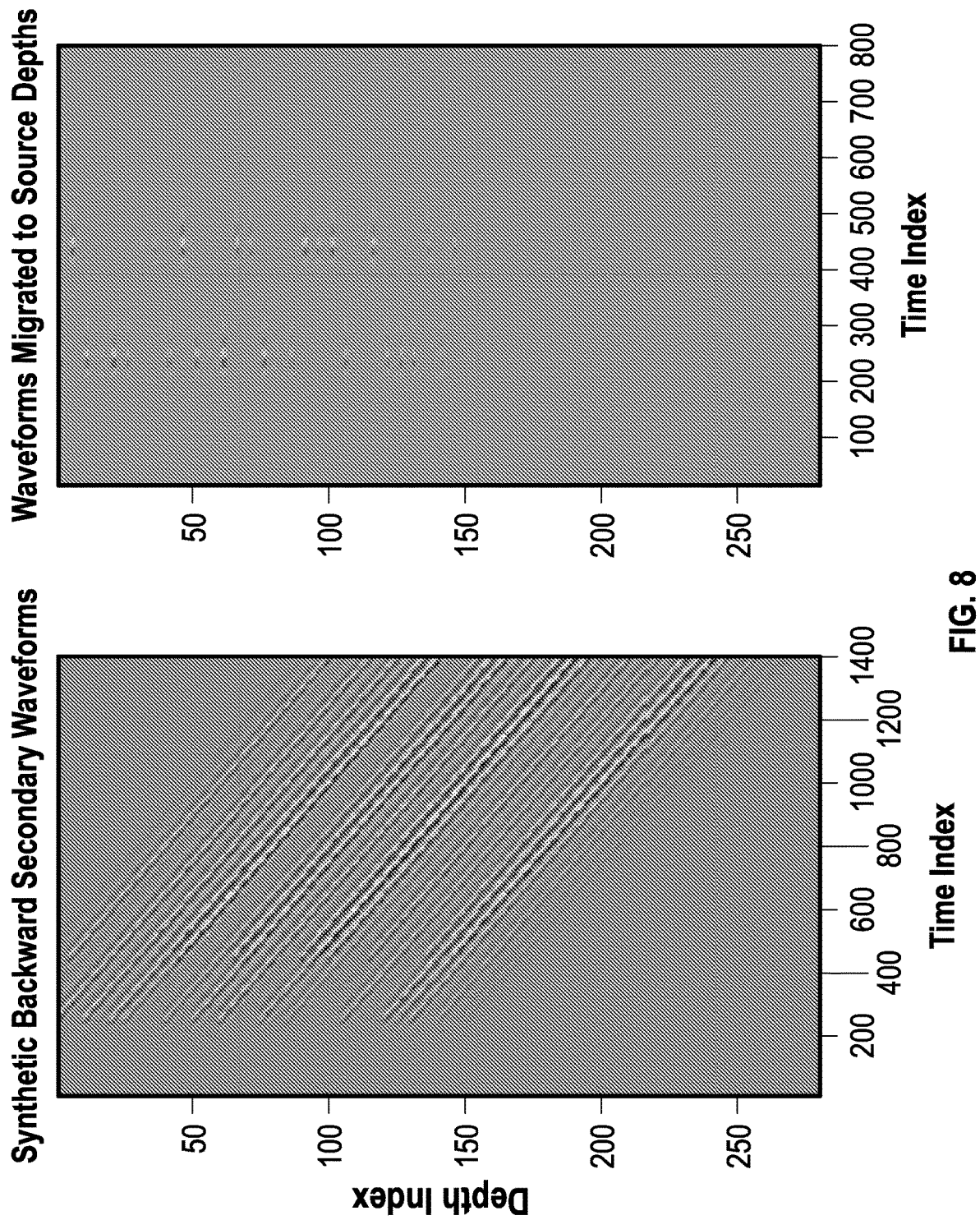
FIG. 8 is a graph of exemplary log tracks resulting from a migration of synthetic backward waves for respective source depths.

The time domain log track for the source waveforms at all depths is computed as the Fourier transform of equation (11). The delays needed to compute the matrix A(d, d') are determined from the Stoneley wave formation slowness, $S_{RX}(d, \omega)$, shown in FIG. 6. High depth resolution can be achieved using common depth semblance processing, e.g.

computing phase delays across multiple receiver pairs centered on the same depth taken from different shots (transmitter locations) as the tool moves. The delays, T, are computed as the integration over depth of the slowness, $s_{2d}$, from depth d' to depth d for each frequency. $s_{2d}$ is a function of $S_{RX}(d, \omega)$. FIG. 8 is a graph of exemplary log tracks resulting from migrating synthetic backward waves to respective source depths. The left log track shows a series of closely spaced, randomly scaled and shifted synthetic sources assuming the model of equation (9).

The right log track shows the source waveforms at their depth locations after applying eqn. (11) and Fourier transforming back to the time domain. The resolution is very good. Waveforms from neighboring depths are resolved even if their energy overlapped in the original waveform. FIG. θ is a graph of exemplary log tracks resulting from a migration of field data backward waves to their source depths for a receiver. Here, FIG. 9 provides an example with real data. The left hand track shows the result of the first embodiment wave extraction, and the track on the right shows the result of the first embodiment for source location. The method clearly shows where the sources are located in depth and migrates the waveform to its source. If desired the waveform energy at each depth after the migration may be plotted as well and a peak detector used to identify the depths of strong (above an energy threshold) reflectors.

As shown, the source waveform log track computed by equation (11) for a receiver will be depth shifted relative to the waveform log track of another receiver according to the relative position of the receivers in the receiver array. If the tracks are combined they must be registered first (depth shift corrected).

Figure 10:
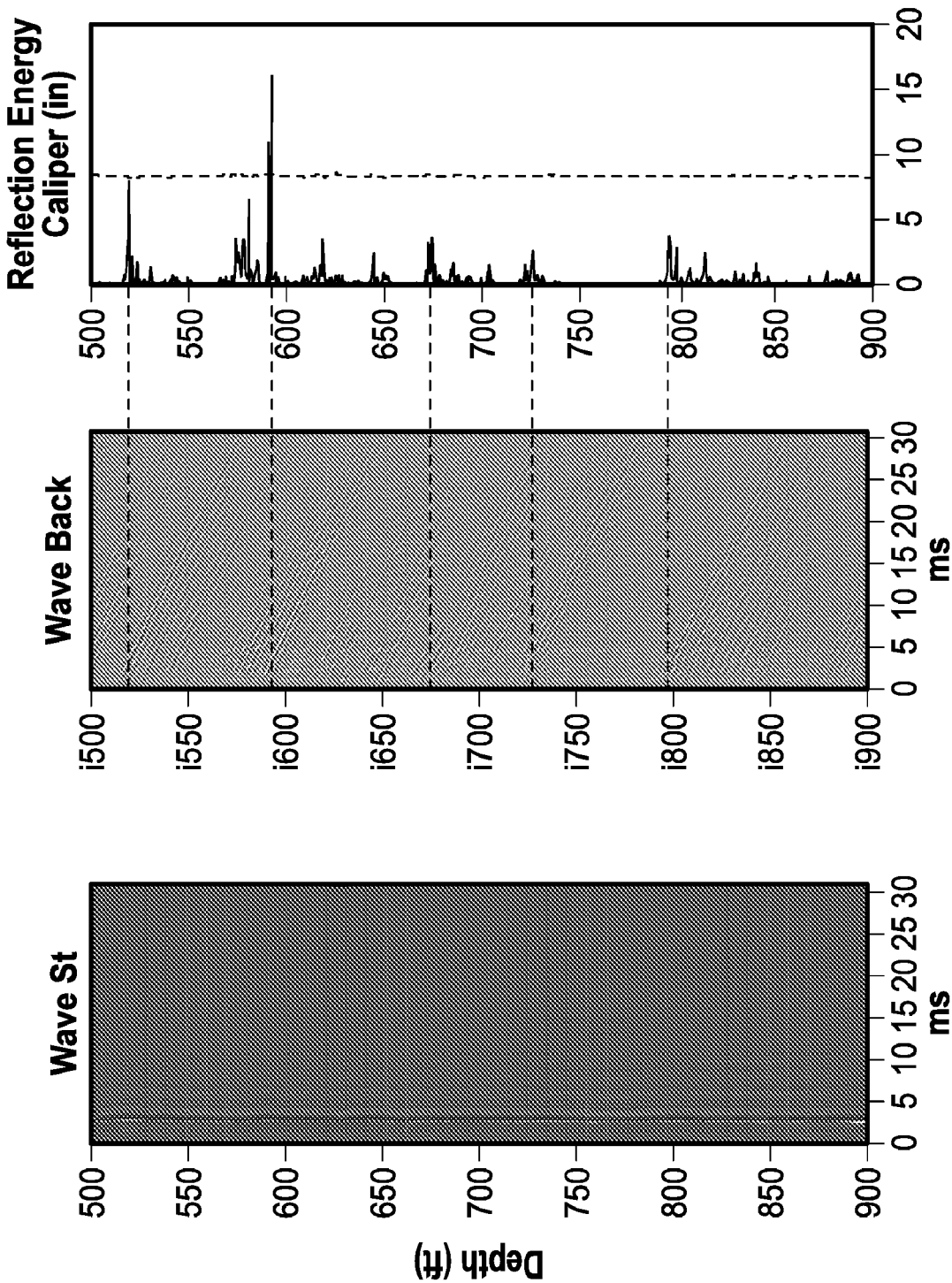
FIG. 10 is a graph of exemplary log tracks showing a slant stack of energy in waveforms as a function of depth.

A second embodiment for source location is now given as a continuation of the second embodiment of the wave extraction. For example, FIG. 10 is a graph of exemplary log tracks showing a slant stack of energy in waveforms as a function of depth. As shown, the peak amplitude arrival time, $T_p$, is picked from the direct wave log track at each depth. This defines the time base-line as a function of depth for computing the energy stack of the backward secondary waves along a sloped line. This method particularly applicable for the second embodiment of the wave separation since it avoids processing the non-causal attenuating early arrivals of the secondary wave. The slope of the line is given by the slowness $S_{2d}$, where $S_{2d}$ is a single value for each depth derived from the frequency dependent $s_{2d}$ of equation (4). As an example $S_{2d}$ could simply be the frequency response weighted mean over frequency of $s_{2d}$. Alternatively a time semblance slowness value could be used. The slope is locally varied about this value and the energy is recomputed. The maximum energy value over the locally varied slopes is saved for that depth. The bounds of the local slowness variation, $\Delta S$ may be a user input or computed as the standard deviation over frequency of $s_{2d}$. Thus the equation for computing the energy stack is:

$$E(d) = \max_{ds \in [-\Delta S, \Delta S]} \left[ \sum_{d'=d}^{d+D} (W(T_p + (d' - d)(S_{2d} + ds), d))^2 \right] \quad (12)$$

This creates an energy stack curve vs. depth. A peak detector is used to identify the discrete depths of (above an energy threshold) reflectors.

Those skilled in the art may arrive at many other variations of the two described embodiments for secondary source location. The two embodiments described here are not meant to limit the techniques discussed herein.

Reflectivity

The reflectivity is essentially a deconvolution of the secondary source and direct waves. Although this disclosure discusses the backward traveling secondary wave, either the forward or backward secondary source may be used. In the first embodiment the secondary source waveforms are located at their correct depths, and it is convenient to compute a continuous reflectivity as a function of depth and frequency as:

$$R(d, \omega) = \frac{W(d, \omega)}{D(d, \omega)} \quad (13)$$

Where $D(d, \omega)$ is the Fourier transform of the extracted direct waves shown on the left hand side of FIG. 5, and $W(d, \omega)$ is computed using equation (11) from a secondary source log track. The calculation may be repeated for individual receiver log tracks and combined if they were corrected for the relative depth shift of the receivers, for example:

$$R(d, \omega) = \frac{1}{N_r} \sum_{n=1}^{N_r} \frac{W(d, \omega, n_r)}{D(d, \omega, n_r)} \quad (14)$$

Alternatively if only the magnitude of the reflectivity is used in the inversion the reflectivity may be computed as:

$$R(d, \omega) = \frac{1}{N_r} \sum_{n=1}^{N_r} \left| \frac{W(d, \omega, n_r)}{D(d, \omega, n_r)} \right| \quad (15)$$

It may be that the reflectivity has an anomalous value at some frequencies due to a null in the response of the direct wave. These frequencies are simply avoided in the inversion described in the next section. Alternatively, the reflectivity at these frequencies could be replaced by some function of the peak value of the power spectrum.

Figure 11:
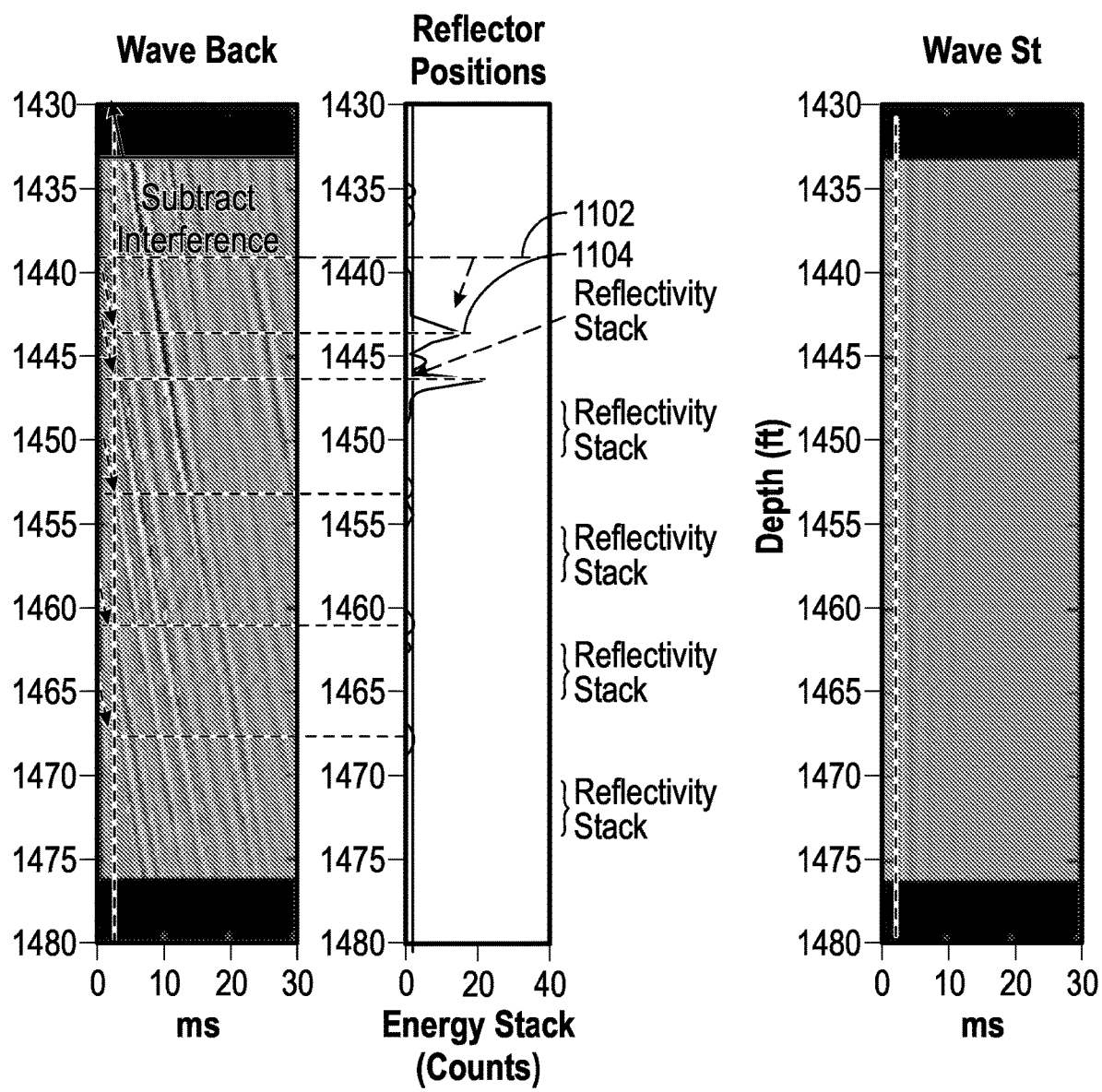
FIG. 11 is a graph of exemplary backwards reflected waves and corresponding energy stack peaks and reflectivity computation stacks.

The second embodiment for the secondary source depth location applied a threshold to an energy stack to locate discrete reflections as shown in the middle track of FIG. 11. In particular, FIG. 11 is a graph of exemplary backwards reflected waves and corresponding energy stack peaks and reflectivity computation stacks. This method for depth location computes a reflectivity for each discrete reflection identified as a peak in the energy stack. Each peak is a contiguous set of depths where the energy stack is above a threshold. Back reflections from the contiguous sets of depths in between the ones that define the peaks are used to compute the reflectivity. The reflectivity computed from a set of depths (reflectivity stack) is associated with the reflector just above the set of depths. If there are enough candidate depths for computing a reflectivity a user input for the depth offset from the reflector to the start of the stack and the number of stack depths used is applied. If only the magnitude of the reflectivity is used in the inversion the reflectivity is computed as:

$$R(d_p, \omega) = \frac{1}{N_d} \sum_{n=1}^{N_d} \left| \frac{W(d_n, \omega)}{D(d_n, \omega)} \right| \quad (16)$$

Where $N_d$ is the number of depths in the reflectivity stack and W is the Fourier transform of the secondary source log track waveform for each depth, $d_n$, in the stack. $d_p$ is the depth of the associated reflector peak.

Notably, still referring to FIG. 11, if desired the strong interfering reflection at the top is subtracted from the backward wave used to compute the reflectivity for the peak at 1443 ft.

Figure 12:
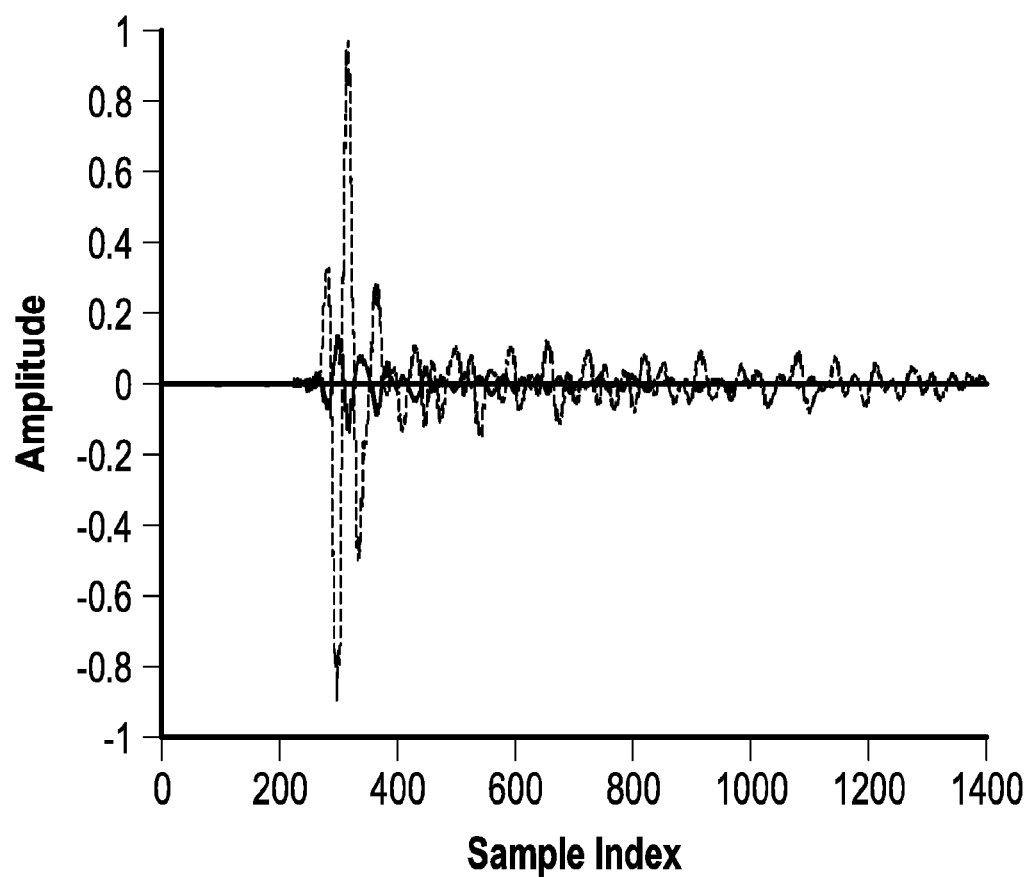
FIG. 12 is a graph of exemplary reflector waveforms after a delay correction.

If the phase is also used in the inversion the secondary source waveform at each depth in the stack must be time shifted to line up with the direct wave in the time domain (equivalently one may multiply by a complex phase in the frequency domain). FIG. 12 is a graph of reflector waveforms after a delay correction. The time shifts (relative to the direct wave peak amplitude) used to compute the energy stack are also used to line up the secondary waves on the direct wave. These shifts may be fine-tuned using cross-correlation between the waveforms in the stack. The complex reflectivity is computed as:

$$R(d_p, \omega) = \frac{1}{N_d} \sum_{n=1}^{N_d} \frac{W(d_n, \omega)}{D(d_n, \omega)} \quad (17)$$

As shown in FIG. 12, the secondary source waveforms are time shifted to line up on a direct wave.

Figure 13:
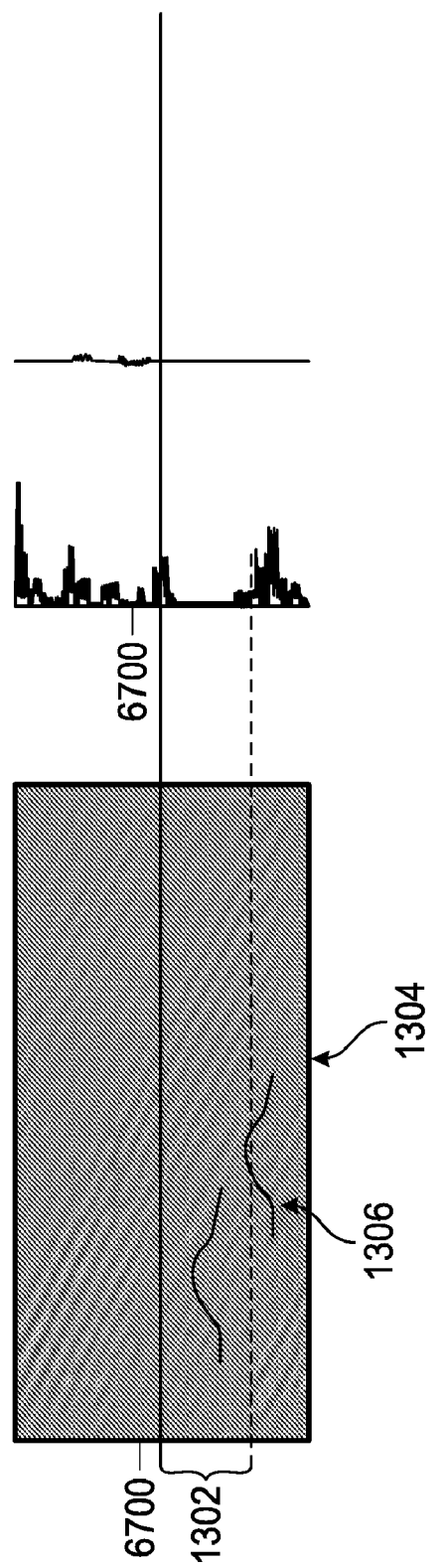
FIG. 13 is a graph of an applied tapering technique to remove interference.

Recall in the first embodiment interference between secondary sources was not a problem because the high resolution depth location equation (11) separates waves at neighboring depths even when they overlap in time in the original waveforms. In the second embodiment, interference can occur between sources. As an example there is a very bright reflector at the top of the backwards secondary source log track in FIG. 11 (its peak is out of bounds on the energy stack and not visible, it is visible in FIG. 18). This reflector will interfere with the secondary waveforms in the reflectivity stack for the reflector peak at 1443.5 ft. One may subtract the interfering waveform by selecting a depth (line labeled "1102" at 1439 ft. in FIG. 11) from the contiguous set of depths above the reflector 1104 at 1443.5 ft. as a template. It is assumed that the interference at successive depths in the reflector stack is a time shifted and scaled copy of the template waveform. Depth-to-depth cross-correlation is used to track the time shift and scaling of the peak amplitude in the template waveform down to the stack depths. The template is shifted, scaled, and subtracted from the reflectivity stack waveforms to remove the interference. Another method for reducing interference is multiplying the secondary waves with a tapered window (e.g. Tukey window) centered on the secondary waveform peak. The positioning of the taper is determined by the delays used to compute the energy stack. Candidate depths 1302 are identified and the width of the window is determined by the relative positions of neighboring reflectors 1304 as shown in FIG. 13. If a taper flag 1306 is set, a sliding taper is applied to isolate reflection. Taper is also applied to direct wave. The direct wave is multiplied by the same window shifted to line up on the peak amplitude of the direct wave. After removing the interference the waveforms are Fourier transformed and the reflectivity is computed according to equations (16) and (17).

Those skilled in the art may arrive at many other variations of the two described embodiments for computing the reflectivity. The two embodiments described here are not meant to limit this disclosure.

Inversion

Figure 14:
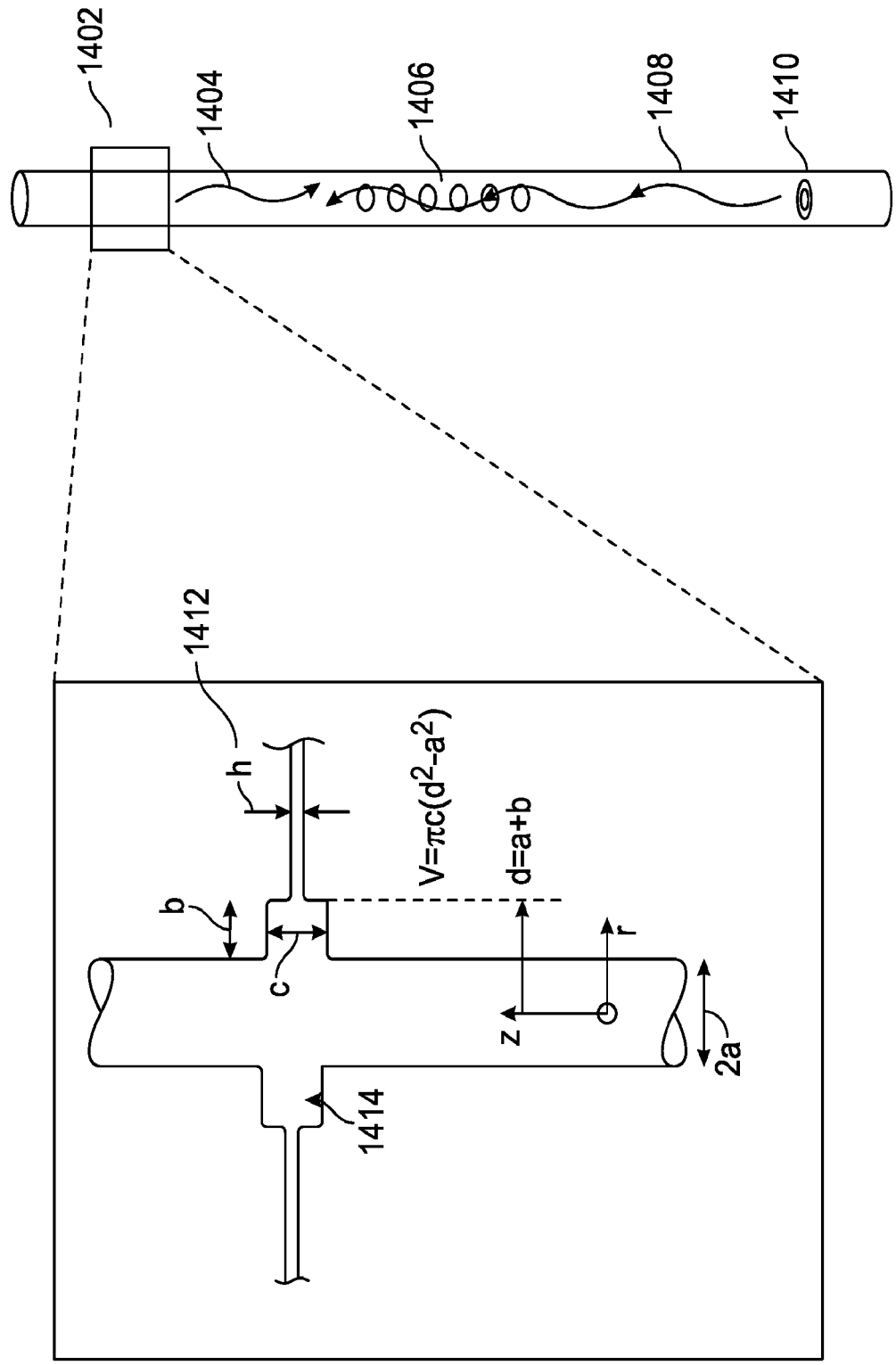
FIG. 14 is a schematic diagram of a physical model for fracture analysis.

The physical model for the fracture analysis is shown in FIG. 14 where the reflector is assumed to be a washout, fracture, or a combination thereof. A low frequency monopole source 1410 is fired and the Stoneley wave 1408 impinges on a secondary source 1402 that generates a backward traveling (in our example) waveform 1404. The direct wave 1408 and the backward traveling waveform 1404 individually pass through receivers 1406. The secondary source 1402 is modeled in the long wavelength limit as a point like object located at position z in the borehole. The object consists of a washout 1414, a conductive fracture, or a combination of both. Dependence on fracture dip, as well as effects caused by formation bedding, are assumed to be of lower order, and are discriminated by comparison of the inversion results with borehole images. The horizontal fluid-filled fracture intersecting the borehole can identify washout 1414 and fracture height 1412.

Under these assumptions the set of reflectivities for the depths, whether discrete or continuous, are used to invert for fracture width, h, and washout volume, V, according to:

$$R(\omega) = \frac{W(\omega)}{D(\omega)} = T(\omega) - 1 = \frac{j\left[\frac{kV}{2\pi a^2} - \frac{dh H_1^{(1)}(kd)}{a^2 H_0^{(1)}(kd)}\right]}{1 - j\left[\frac{kV}{2\pi a^2} - \frac{dh H_1^{(1)}(kd)}{a^2 H_0^{(1)}(kd)}\right]} \quad (18)$$

In equation (18) d is now the radius of the outer annulus of the washout (not depth) and a is the inner radius. If there is no washout d=a. $H^{(1)}$ is the Hankel function of the first kind, and $$k = \omega/v_f \quad (19)$$

Where $v_f$ is the borehole fluid velocity.

Figure 15:
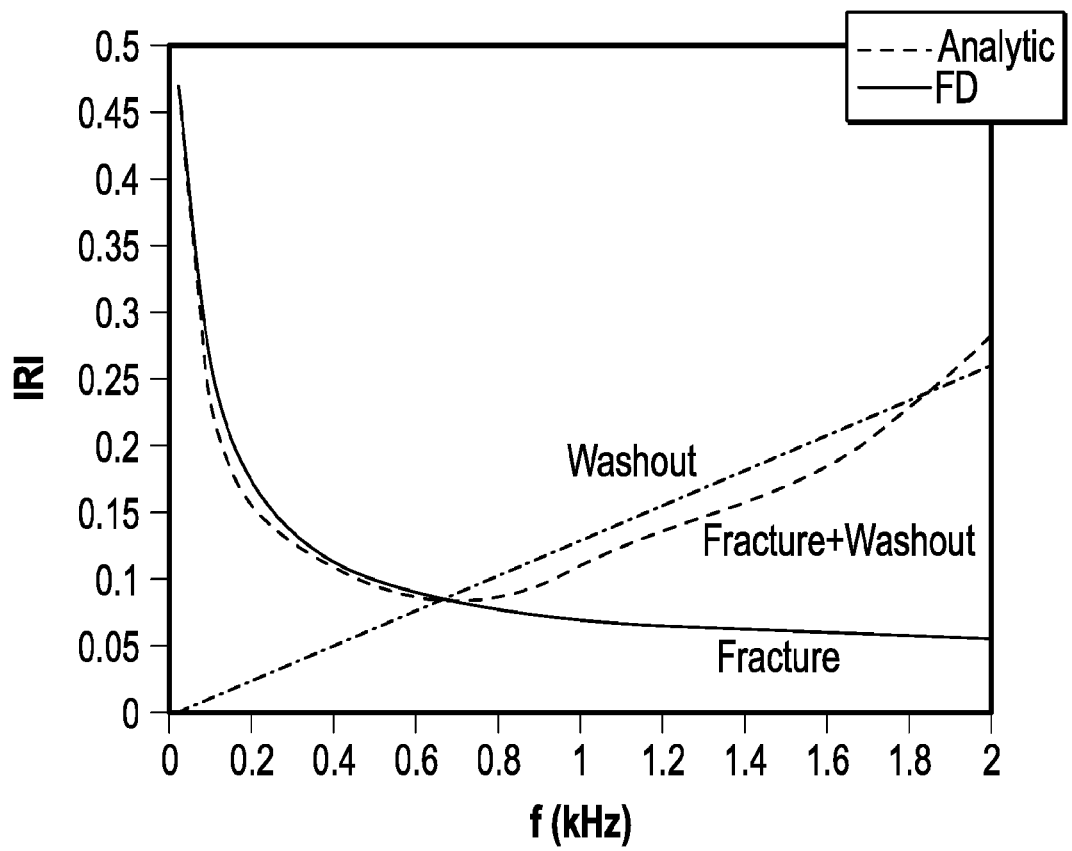
FIG. 15 is a graph of theoretical curves with finite difference data.

FIG. 15 shows a comparison of equation (18) with finite difference results. The dependencies of the reflectivity on the washout volume and fracture width are fundamentally different as a function of frequency. The dependence on washout volume is linear with respect to frequency, whereas the dependence on fracture width diverges at low frequencies. Thus if the waveforms have sufficiently low frequency bandwidth it is possible to invert for fracture width and washout volume. See FIG. 16, which shows FDM modeled with analytic theory for case of combined conductive fracture and borehole enlargement. If we consider the dashed line to be the field data response, and the solid curve to be the best fitting model response, then the model parameters (fracture width and borehole enlargement) are the inverted parameter of interest for the Stoneley wave response at that depth level.

Ideally the lower bound on frequency is as low as possible. In practice it is limited by the capabilities of current acoustic tools to 300-500 Hz. The upper bound is typically 2-4 KHz. The inversion for fracture width and washout volume may use reflectivity magnitude only, or both phase and magnitude. In practice the inversion is done in the normalized parameter space (x, y)=($h/a^2$, $V/a^2$) as this eliminates the variable a from equation (18). The inner annulus, a, may be estimated from caliper measurements at the reflectivity stack depths or simply set to the bit-size. The inversion may be done numerically or analytically. The outer washout radius, d, may be computed from caliper measurements at the secondary source depths or estimated as a third inversion parameter with initial value given by the caliper. Analytic inversion using only the magnitude is possible, but mathematically complicated. The preferred embodiment for magnitude only inversion is numerical. A set of theoretical curves are computed using equation (18) on a user defined grid in the 2D (x, y)=(h/a², V/a²) parameter space. The curves may be computed 'on the fly' or stored in a library. The objective function is the frequency weighted L2 norm of the difference between the computed reflectivity and the theoretical curves.

$$L2(x, y) = \sum_{\omega=\omega_{min}}^{\omega_{max}} (R_D(\omega) - |R(\omega, x, y)|)^2 W(\omega) \quad (20)$$

Where R is the theoretical curve from equation (18) and $R_D$ is the reflectivity magnitude computed from the data using equation (15) or (16). Obviously if one inverts numerically using both magnitude and phase the modulus is removed in equation (20) and $R_D$ is computed from equation (14) or (17). In equation (20) W is not the waveform, it is a frequency dependent weighting. For example W could be a binary mask used to dampen frequencies where the direct wave has a null. The estimated values of the normalized washout volume and fracture width are defined as the values on the grid that minimize the objective function. Alternatively, both the magnitude and phase may be used in the inversion. In this case an analytic solution is easily found if we define the objective function as:

$$L2(x, y) = \sum_{\omega=\omega_{min}}^{\omega_{max}} |C_D(\omega) - C(\omega, x, y)|^2 W(\omega) \quad (21)$$

Where,
$$C_D = [R_D^{-1} + 1]^{-1}, \quad (22)$$

And similarly from equation (18)

$$C(\omega, x, y) = [R^{-1} + 1]^{-1} = \quad (23)$$
$$x \operatorname{Im}\left[\frac{dh H_1^{(1)}(kd)}{a^2 H_0^{(1)}(kd)}\right] + j\left[\frac{kV}{2\pi a^2} - x \operatorname{Re}\left[\frac{dh H_1^{(1)}(kd)}{a^2 H_0^{(1)}(kd)}\right]\right] \equiv j(y\tilde{C} - xC_H)$$

Where:

$$\tilde{C} \equiv \frac{k}{2\pi}, \quad (23a)$$
and
$$C_H \equiv \frac{dH_1^{(1)}(kd)}{H_0^{(1)}(kd)} \quad (23b)$$

Expanding equation (21) gives:
$$L2(x,y) = C_0 + C_{11}x^2 + C_{22}y^2 + C_1 x + C_2 y + C_{12} xy \quad (25)$$
Where $$C_0 = \sum_\omega |C_D|^2 W(\omega), \quad (26a-f)$$

$$C_1 = -2\sum_\omega \operatorname{Im}[C_D^* C_H] W(\omega),$$

-continued $$C_2 = -2\sum_\omega \operatorname{Im}[C_D]\tilde{C} W(\omega),$$

$$C_{12} = -2\sum_f \operatorname{Re}[C_H]\tilde{C} W(\omega),$$

$$C_{11} = \sum_\omega |C_H|^2 W(\omega),$$

$$C_{22} = \sum_\omega \tilde{C}^2 W(\omega).$$

The analytic solution to the minimization of equation (25) is:

$$x = -\frac{(C_1 - \alpha C_2)}{2(C_{11} + \alpha^2 C_{22} - \alpha C_{12})} \quad (27)$$

And $$y = -\frac{C_{12}}{2C_{22}} - \alpha x \quad (28)$$

Where:

$$\alpha = \frac{C_{12}}{2C_{22}} \quad (29)$$

Note from equation (23) that the real part of the function C only depends on x. Thus an alternative embodiment inverts for x first from the real part of C and then inverts for y. This gives slightly different equations for the solution that are mathematically equivalent to the solution given in equations (27-29) when there is no noise (i.e. misfit between theory and data). It is important to note that any error in the alignment of the secondary source waves with the direct wave results in phase error in the function C. However, it is possible to invert for an unknown linear phase error as well. This can be done numerically by applying different linear (in frequency) phases $R_{test} = e^{-j\omega T} R_D$ to the reflectivity data before inverting and selecting the linear phase that minimizes the objective function. This correction (which neglects dispersion) is equivalent to a depth location correction given by:

$$\Delta z = \frac{\omega T}{k} \quad (30)$$

Figure 16:
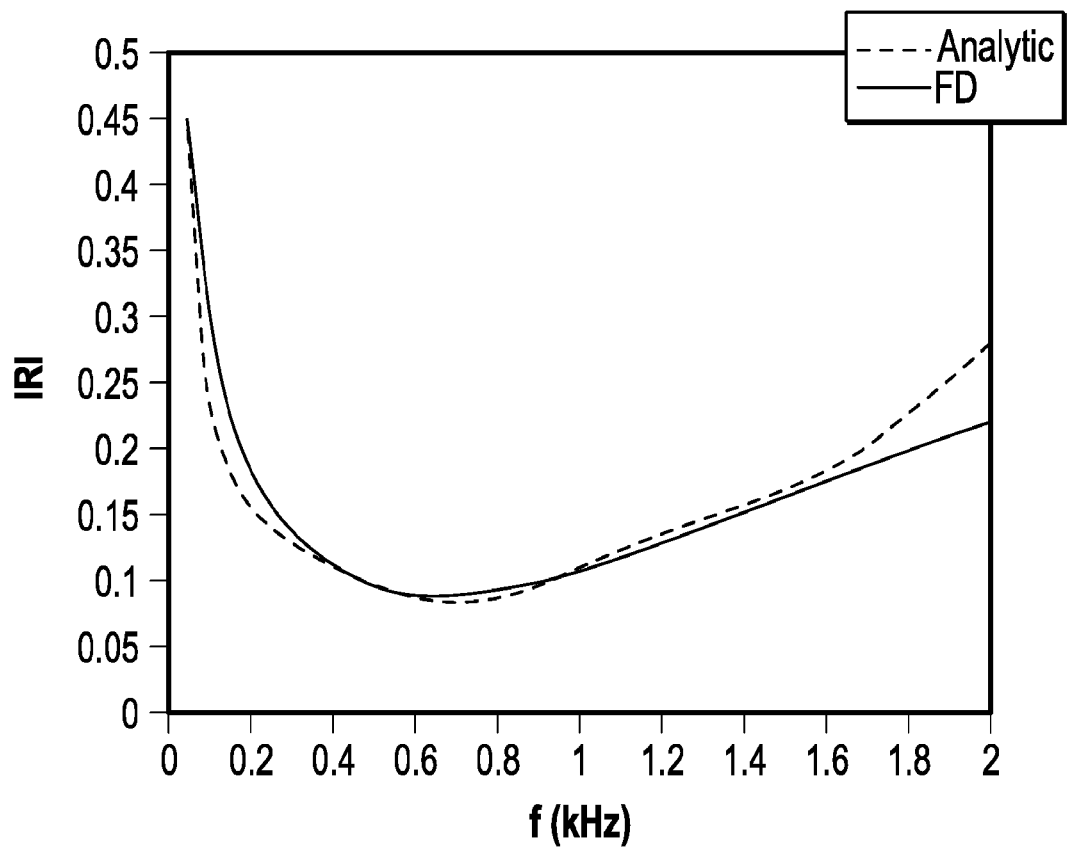
FIG. 16 is a graph of an FDM modeled with analytic theory for combined conductive fracture and borehole enlargement.

It is also possible, in the limit of small phase error, to minimize an objective function for (x, y, T) analytically. Those skilled in the art may devise many other variations of the embodiments for inverting an objective function to determine washout volume and fracture width over a frequency bandwidth. The techniques regarding use of a full low frequency bandwidth improve the robustness of the inversion and better discriminate washouts vs. conductive fractures. FIG. 16 shows the results of a magnitude only inversion. Two energy peaks are identified just above and below 1445 ft. Both peaks indicate a similar washout volume consistent with the caliper enlargement. However only the lower peak shows a conductive fracture. As shown, the circled depth has a washout, while the depth just below has both a washout and a fracture.

Figure 17:
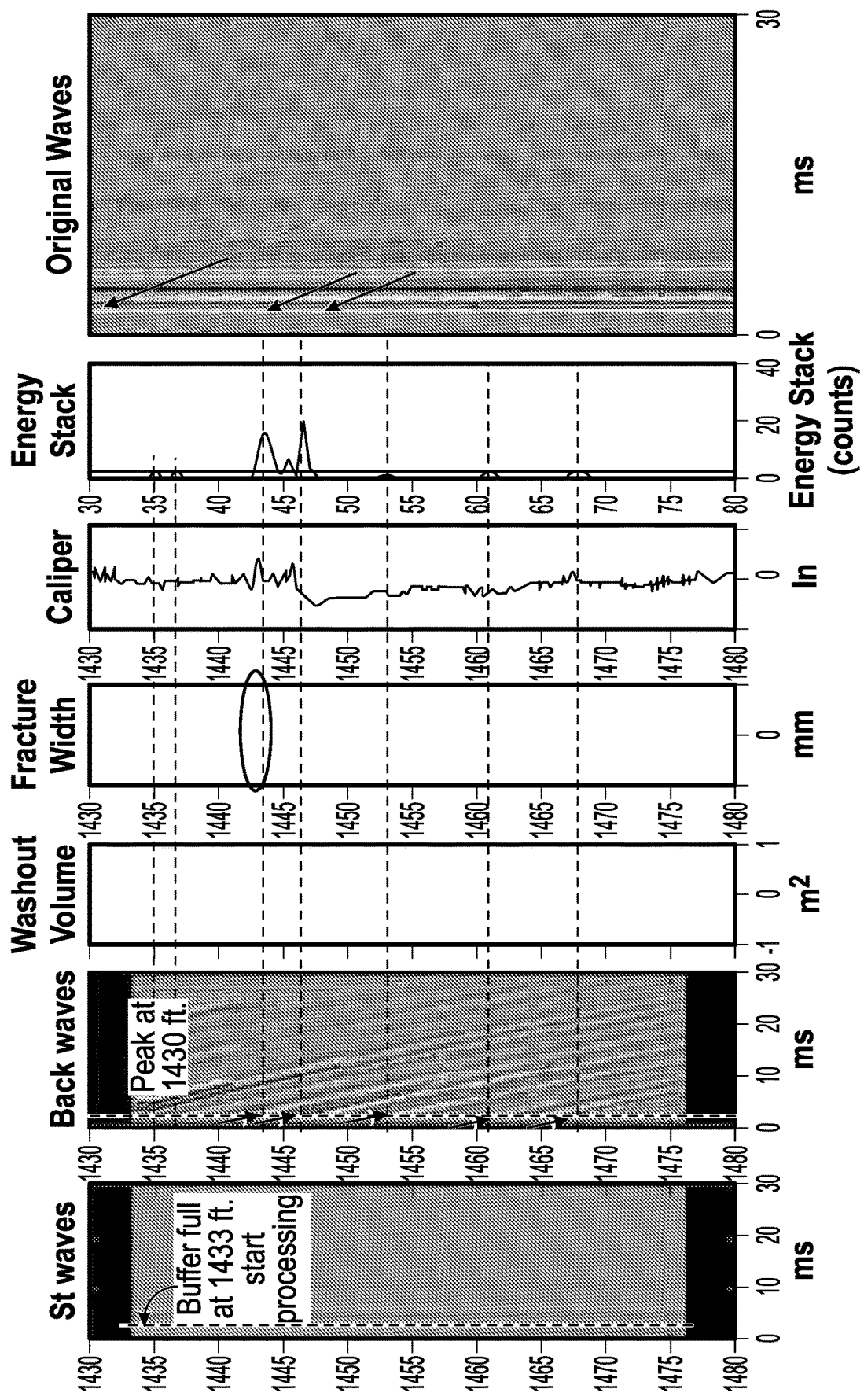
FIG. 17 is a graph of an exemplary discrete inversion for washout volume and fracture width.

FIG. 17 shows an XRMI image of this region with an apparent fracture in the lower right corner (circled in red) of the image consistent with the inversion result. As shown, on the right is an XRMI image showing a possible fracture (circled).

While there have been shown and described illustrative embodiments for locating and estimating conductivity of fractures in boreholes using Stoneley waves, it is to be understood that various other adaptations and modifications may be made within the spirit and scope of the embodiments herein. For example, the embodiments have been shown and described herein with relation to Stoneley waves measured by a sonic logging tool. However, the embodiments in their broader sense are not as limited, and may, in fact, be used with any type of suitable generated disturbances and various types of logging tools. In addition, while the embodiments are shown and discussed with certain devices/modules performing certain operations, it is appreciated that various other devices may be readily modified to perform operations without departing from the sprit and scope of this disclosure.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed:

1. A method comprising:
receiving a total response signal by a sensor array disposed in a borehole, the response signal represents a pressure wave propagating in the borehole;
extracting direct Stoneley waves and secondary Stoneley waves from the total response signal;
determining a borehole depth location for at least one source of the secondary Stoneley waves; and
for the at least one source of the secondary Stoneley waves:
determining an estimated reflectivity response for the secondary Stoneley waves as a function of frequency;
inverting the estimated reflectivity response to calculate a fracture conductivity or washout volume for a theoretical fracture or washout, respectively, at the determined borehole depth location;
examining one or more borehole images at the determined borehole depth location to verify whether an actual fracture or washout exists that is consistent with the inverted estimated frequency response; and
reporting the actual fracture or washout with the calculated fracture conductivity or washout volume.

2. The method of claim 1, wherein receiving the total response signal further comprises:
receiving the total response signal over a plurality of depth locations in the borehole.

3. The method of claim 1, wherein extracting the secondary Stoneley waves from the total response signal further comprises:
separating the secondary Stoneley waves from the total response signal by stack shifting one or more waveforms in the total response signal.

4. The method of claim 3, wherein the total response signal includes a plurality of waveforms, the method further comprising:
cross-correlating a first set of waveforms of the plurality of waveforms corresponding to a first depth to a second set of waveforms of the plurality of waveforms corresponding to a second depth to estimate a time shift coefficient for stack shifting the one or more waveforms in the total response signal, and
wherein, separating the direct Stoneley waves and the secondary Stoneley waves further includes separating the direct Stoneley waves and the secondary Stoneley waves based on stack shifting the one or more waveforms based on the time shift coefficient.

5. The method of claim 1, wherein cementing operations are determined based on fracture conductivity or washout volume.

6. The method of claim 1, wherein mud weight is determined based on fracture conductivity or washout volume.

7. The method of claim 1, wherein the estimated reflectivity response, R, is inverted according to the equation:

$$R(\omega) = \frac{j\left[\frac{kV}{2\pi a^2} - \frac{dh H_1^{(1)}(kd)}{a^2 H_0^{(1)}(kd)}\right]}{1 - j\left[\frac{kV}{2\pi a^2} - \frac{dh H_1^{(1)}(kd)}{a^2 H_0^{(1)}(kd)}\right]}$$

where:
h=fracture width,
V=washout volume,
$\omega$=angular frequency,
$v_f$=borehole fluid velocity,
k=$\omega/v_f$,
d is a radius of outer annulus of a washout, and
d=a. $H^{(1)}$ is a Hankel function of the first kind.

8. A borehole tool comprising:
one or more sensors to detect pressure changes in a borehole;
a processor coupled to the one or more sensors and adapted to execute one or more processes; and
a memory configured to store a process executable by the processor, the process, when executed, is operable to:
receive a total response signal by the one or more sensors, the response signal represents a pressure wave propagating in the borehole;
extract direct Stoneley waves and secondary Stoneley waves from the total response signal;
determine a borehole depth location for at least one source of the secondary Stoneley waves; and
for the at least one source of the secondary Stoneley waves:
determine an estimated reflectivity response for the secondary Stoneley waves as a function of frequency;
invert the estimated reflectivity response to calculate a fracture conductivity or washout volume for a theoretical fracture or washout, respectively, at the determined borehole depth location;
examine one or more borehole images at the determined borehole depth location to verify whether an actual fracture or washout exists that is consistent with the inverted estimated frequency response; and
report the actual fracture or washout with the calculated fracture conductivity or washout volume.

9. The borehole tool of claim 8, wherein the process to receive the total response signal, when executed, is further operable to:
receive the total response signal over a plurality of depth locations in the borehole.

10. The borehole tool of claim 8, wherein the process to extract the secondary Stoneley waves, when executed, is further operable to:
separate the secondary Stoneley waves from the total response signal by stack shifting one or more waveforms in the total response signal.

11. The borehole tool of claim 10, wherein the total response signal includes a plurality of waveforms, wherein the process, when executed, is further operable to:
cross-correlate a first set of waveforms of the plurality of waveforms corresponding to a first depth to a second set of waveforms of the plurality of waveforms corresponding to a second depth to estimate a time shift coefficient for stack shifting the one or more waveforms in the total response signal, and
wherein, the process to separate the direct Stoneley waves and the secondary Stoneley waves, when executed, is further operable to:
separate the direct Stoneley waves and the secondary Stoneley waves based on stack shifting the one or more waveforms based on the time shift coefficient.

12. The borehole tool of claim 8, wherein cementing operations are determined based on fracture conductivity or washout volume.

13. The borehole tool of claim 8, wherein mud weight is determined based on fracture conductivity or washout volume.

14. The borehole tool of claim 8, wherein the estimated reflectivity response, R, is inverted according to the equation:

$$R(\omega) = \frac{j\left[\frac{kV}{2\pi a^2} - \frac{dh H_1^{(1)}(kd)}{a^2 H_0^{(1)}(kd)}\right]}{1 - j\left[\frac{kV}{2\pi a^2} - \frac{dh H_1^{(1)}(kd)}{a^2 H_0^{(1)}(kd)}\right]}$$

where:
h=fracture width,
V=washout volume,
$\omega$=angular frequency,
$v_f$=borehole fluid velocity,
k=$\omega/v_f$,
d is a radius of outer annulus of a washout, and
d=a. $H^{(1)}$ is a Hankel function of the first kind.

15. A tangible, non-transitory, computer-readable media having software encoded thereon, the software, when executed by a processor, operable to:
receive a total response signal representing a pressure wave propagating in a borehole;
extract direct Stoneley waves and secondary Stoneley waves from the total response signal;
determine a borehole depth location for at least one source of the secondary Stoneley waves; and
for the at least one source of the secondary Stoneley waves:
determine an estimated reflectivity response for the secondary Stoneley waves as a function of frequency;
invert the estimated reflectivity response to calculate a fracture conductivity or washout volume for a theoretical fracture or washout, respectively, at the determined borehole depth location;
examine one or more borehole images at the determined borehole depth location to verify whether an actual fracture or washout exists that is consistent with the inverted estimated frequency response; and
report the actual fracture or washout with the calculated fracture conductivity or washout volume.

16. The tangible, non-transitory, computer-readable media of claim 15, wherein the software, when executed by the processor to receive the total response signal, is further operable to:

receive the total response signal over a plurality of depth locations in the borehole.

17. The tangible, non-transitory, computer-readable media of claim 16, wherein the software, when executed by the processor to extract the secondary Stoneley waves, is further operable to:
separate the secondary Stoneley waves from the total response signal by stack shifting one or more waveforms in the total response signal.

18. The tangible, non-transitory, computer-readable media of claim 15, wherein the estimated reflectivity response, R, is inverted according to the equation:

$$R(\omega) = \frac{j\left[\frac{kV}{2\pi a^2} - \frac{dhH_1^{(1)}(kd)}{a^2 H_0^{(1)}(kd)}\right]}{1 - j\left[\frac{kV}{2\pi a^2} - \frac{dhH_1^{(1)}(kd)}{a^2 H_0^{(1)}(kd)}\right]}$$

where:
h=fracture width,
V=washout volume,
ω=angular frequency,
$v_f$=borehole fluid velocity,
k=ω/$v_f$,
d is a radius of outer annulus of a washout, and
d=a. $H^{(1)}$ is a Hankel function of the first kind.

* * * * *